(12) United States Patent
Gillman et al.

(10) Patent No.: US 12,498,908 B2
(45) Date of Patent: Dec. 16, 2025

(54) METHODS AND SYSTEMS FOR AUTOMATICALLY GENERATING AND EXECUTING COMPUTER CODE USING A NATURAL LANGUAGE DESCRIPTION OF A DATA MANIPULATION TO BE PERFORMED ON A DATA SET

(71) Applicant: Akkio Inc., Boston, MA (US)

(72) Inventors: Nate Gillman, New York, NY (US); Nadia Lahlaf, Billerica, MA (US); Aperahama Parangi, Boston, MA (US); Jonathon Reilly, Cambridge, MA (US); Nathan Wies, Brookline, MA (US)

(73) Assignee: Akkio Inc., Boston, MA (US)

( * ) Notice: Subject to any disclaimer, the term of this patent is extended or adjusted under 35 U.S.C. 154(b) by 0 days.

(21) Appl. No.: 18/375,371

(22) Filed: Sep. 29, 2023

(65) Prior Publication Data

US 2024/0028312 A1    Jan. 25, 2024

Related U.S. Application Data

(63) Continuation-in-part of application No. 17/158,681, filed on Jan. 26, 2021.
(Continued)

(51) Int. Cl.
*G06N 20/00* (2019.01)
*G06F 8/35* (2018.01)

(52) U.S. Cl.
CPC .............. *G06F 8/35* (2013.01); *G06N 20/00* (2019.01)

(58) Field of Classification Search
CPC .................................. G06F 8/35; G06N 20/00
See application file for complete search history.

(56) References Cited

U.S. PATENT DOCUMENTS 6,453,465 B1  9/2002  Klein
8,903,711 B2  12/2014 Lundberg
(Continued)

FOREIGN PATENT DOCUMENTS

CN    110489102    11/2019
CN    112748906     5/2021
(Continued)

OTHER PUBLICATIONS

Chen, Mark, Jerry Tworek, Heewoo Jun, Qiming Yuan, Henrique Ponde de Oliveira Pinto, Jared Kaplan, Harri Edwards et al. "Evaluating large language models trained on code." arXiv preprint arXiv:2107.03374 (2021). (Year: 2021).*
(Continued)

*Primary Examiner* — Casey R. Garner
(74) *Attorney, Agent, or Firm* — KPPB LLP

(57) ABSTRACT

A method for automatically generating and executing computer code includes receiving, by a machine learning engine, a user-specified data set and a user-specified task. The machine learning engine analyzes at least one characteristic of the user-specified data set and at least one characteristic of the user-specified task and generates at least one machine learning model for processing the user-specified data set. The machine learning model generates a first output by processing the user-specified data set. The machine learning engine receives a natural language description of a user-requested data transformation task for execution with a subset of the first output and directs a large language model to identify an archetype of the user-requested data transformation task. The large language model applies the user-requested data transformation task to the subset of the first output using the archetype to generate a second output.

5 Claims, 22 Drawing Sheets

Related U.S. Application Data

(60) Provisional application No. 63/411,898, filed on Sep. 30, 2022.

(56) References Cited

U.S. PATENT DOCUMENTS

| | | | |
|---|---|---|---|
| 9,619,209 B1* | 4/2017 | Allen | G06F 40/205 |
| 9,652,714 B2 | 5/2017 | Achin et al. | |
| 9,939,792 B2 | 4/2018 | Chen | |
| 10,360,482 B1 | 7/2019 | Khare | |
| 10,366,346 B2 | 7/2019 | Achin et al. | |
| 10,431,328 B1 | 10/2019 | Wang | |
| 10,592,386 B2 | 3/2020 | Walters et al. | |
| 10,600,005 B2 | 3/2020 | Gunes et al. | |
| 11,176,329 B2 | 11/2021 | Vaithiyanathan | |
| 2005/0165712 A1 | 7/2005 | Araki | |
| 2014/0022100 A1 | 1/2014 | Fallon | |
| 2016/0071014 A1 | 3/2016 | Brand | |
| 2017/0300814 A1 | 10/2017 | Shaked | |
| 2018/0174047 A1 | 6/2018 | Bourdev et al. | |
| 2019/0050319 A1 | 2/2019 | Gondalia | |
| 2019/0197011 A1 | 6/2019 | Zavesky | |
| 2019/0213115 A1 | 7/2019 | Takawale | |
| 2019/0251439 A1 | 8/2019 | Zoph | |
| 2019/0261243 A1 | 8/2019 | Amini et al. | |
| 2019/0347621 A1 | 11/2019 | White | |
| 2020/0012584 A1 | 1/2020 | Walters et al. | |
| 2020/0012935 A1 | 1/2020 | Goodsitt et al. | |
| 2020/0034665 A1 | 1/2020 | Ghanta et al. | |
| 2020/0090075 A1 | 3/2020 | Achin et al. | |
| 2020/0125568 A1 | 4/2020 | Idicula et al. | |
| 2020/0134489 A1 | 4/2020 | Achin et al. | |
| 2020/0242505 A1 | 7/2020 | Raz et al. | |
| 2020/0245009 A1 | 7/2020 | Saini et al. | |
| 2020/0342265 A1 | 10/2020 | Cai et al. | |
| 2020/0349464 A1 | 11/2020 | Lin et al. | |
| 2020/0356762 A1 | 11/2020 | Wang et al. | |
| 2020/0356857 A1 | 11/2020 | Lee et al. | |
| 2020/0401899 A1 | 12/2020 | Dohan et al. | |
| 2021/0081819 A1* | 3/2021 | Polleri | H04L 51/02 |
| 2021/0232920 A1 | 7/2021 | Parangi | |
| 2021/0256217 A1* | 8/2021 | Vaithiyanathan | G06F 16/33 |

FOREIGN PATENT DOCUMENTS

| | | |
|---|---|---|
| CN | 116400901 | 7/2023 |
| EP | 3355248 A2 | 8/2018 |
| JP | 2023018851 | 2/2023 |
| KR | 102511568 B1 | 3/2023 |
| WO | 2018112514 A1 | 6/2018 |
| WO | 2018223037 A1 | 12/2018 |
| WO | 2018226492 A1 | 12/2018 |
| WO | 2020204904 A1 | 10/2020 |
| WO | 2020214428 A1 | 10/2020 |
| WO | 2021154722 A1 | 8/2021 |
| WO | 2023014370 | 2/2023 |

OTHER PUBLICATIONS

International Search Report and Written Opinion mailed May 4, 2021, in international patent application No. PCT/US2021/015080, 9 pages.

Shin, Jiho, and Jaechang Nam. "A survey of automatic code generation from natural language." Journal of Information Processing Systems 17.3 (2021): 537-555.

International Search Report issued in App. No. PCT/US2023/034209, dated Jan. 19, 2024, 10 pages.

Office Action (Non-Final Rejection) dated Dec. 29, 2023 for U.S. Appl. No. 17/158,681 (pp. 1-12).

Sarsa, Sami, et al. "Automatic generation of programming exercises and code explanations using large language models." Proceedings of the 2022 ACM Conference on International Computing Education Research—vol. 1. 2022.

Vaithilingam, Priyan, Tianyi Zhang, and Elena L. Glassman. "Expectation vs. experience: Evaluating the usability of code generation tools powered by large language models." Chi conference on human factors in computing systems extended abstracts. 2022.

Xu, Frank F., et al. "A systematic evaluation of large language models of code." Proceedings of the 6th ACM SIGPLAN International Symposium on Machine Programming. 2022.

Extended European Search Report issued in App. No. EP20210748262, dated Jan. 25, 2024, 14 pages.

Li et al., 2006, "Improving Generalization Ability of Neural Networks Ensemble with Multi-Task Learning" (Year: 2006).

Office Action (Final Rejection) dated Jul. 12, 2024 for U.S. Appl. No. 17/158,681 (pp. 1-17).

Office Action (Final Rejection) dated Jul. 19, 2024 for U.S. Appl. No. 18/375,371 (pp. 1-22).

Office Action dated Dec. 11, 2023 for U.S. Appl. No. 18/375,371 (pp. 1-21).

* cited by examiner

Direct Mail Campaign

User Interface Engine 109

[< Cancel] [Save & Continue] [ ] OFF

INPUT
Table

Clean up dirty data, predict missing fields, or discover new customer profiles.

INPUT DATASET
Select or upload an existing dataset that represents the kind of data you want to work with.

[Replace] [View]

NAME: Direct Mail Campaign.csv  UPDATED: Last Monday at 12:41 PM  ROWS: 41,189

| NUMBER AGE | CATEGORY JOB | CATEGORY MARITAL | CATEGORY EDUCATION | CATEGORY DEFAULT | CATEGORY HOUSING |
|---|---|---|---|---|---|
| 54 | retired | married | basic.9y | unknown | yes |
| 35 | blue-collar | married | basic.6y | no | yes |
| 46 | blue-collar | married | basic.6y | unknown | yes |
| 50 | management | single | basic.9y | unknown | no |
| 39 | unemployed | married | high.school | no | no |
| 30 | blue-collar | married | basic.4y | unknown | yes |

STEP
Predict
DATASET: Direct Mail Campaign.csv
PREDICTING: subscribed

OUTPUT
Web App

[ADD STEP]

*Fig. 3D*

User Interface Engine 109

| < Cancel | Save & Continue | ☐ OFF |

STEP
Predict
Predict one or more fields based on a dataset.

TRAINING DATASET
Select a dataset to generate predictions.

| Direct Mail Campaign.csv ⌄ |

PREDICT FIELDS
Select which numerical or categorical fields to predict.

SELECT ALL
- ☐ age
- ☐ job
- ☐ marital
- ☐ education
- ☐ default
- ☐ housing
- ☐ loan
- ☐ contact
- ☐ month
- ☐ day_of_week

Direct Mail Campaign ☑

INPUT Table

| age | job | marital | education | default |
|---|---|---|---|---|
| 58 | housemaid | married | basic.4y | no |
| 57 | services | married | high.school | unknown |
| 37 | services | married | high.school | no |
| 40 | admin. | married | basic.6y | no |
| 56 | services | married | high.school | no |

Direct Mail Campaign.csv

STEP Predict ✕

- - - ADD STEP - - -

METHODS AND SYSTEMS FOR AUTOMATICALLY GENERATING AND EXECUTING COMPUTER CODE USING A NATURAL LANGUAGE DESCRIPTION OF A DATA MANIPULATION TO BE PERFORMED ON A DATA SET

CROSS-REFERENCE TO RELATED APPLICATIONS

This application claims priority from U.S. Provisional Patent Application No. 63/411,898, filed on Sep. 30, 2022, entitled "Methods and Systems for Dynamically Generating a Plurality of Machine Learning Systems During Processing of a User Data Set," and is a continuation-in-part of U.S. patent application Ser. No. 17/158,681, filed on Jan. 26, 2021, entitled "Methods and Systems for Dynamically Generating a Plurality of Machine Learning Systems During Processing of a User Data Set," each of which is hereby incorporated by reference.

BACKGROUND

The disclosure relates to methods for dynamically generating machine learning systems. More particularly, the methods and systems described herein relate to functionality for automatically generating and executing computer code using a natural language description of a data manipulation to be performed on a data set generated by a dynamically-generated machine learning engine.

Conventionally, platforms for implementing machine learning are created for use by highly technical users, domain experts in machine learning, and/or data scientists who are typically required to make detailed technical choices throughout the processes for creating and deploying prediction models. Such users must typically have in-depth technical knowledge in configuring cloud compute platforms, preparing data for processing by machine learning models, and so forth. Technology that improves the ease of use in implementing machine learning and for automatically generating executable code to perform user-specified tasks on the output of the implemented machine learning is needed.

BRIEF DESCRIPTION

In one aspect, a method for automatically generating and executing computer code using a natural language description of a data manipulation to be performed on a data set includes receiving, by a machine learning engine, a user-specified data set and a user-specified task. The method includes analyzing, by the machine learning engine, at least one characteristic of the user-specified data set and at least one characteristic of the user-specified task. The method includes generating, by the machine learning engine, at least one machine learning model for processing the user-specified data set, wherein generating further comprises generating the at least one machine learning model based upon the at least one characteristic of the user-specified data set and at least one characteristic of the user-specified task. The method includes directing, by the machine learning engine, the at least one machine learning model to generate a first output by processing the user-specified data set. The method includes receiving, by the machine learning engine, a natural language description of a user-requested data transformation task for execution with a subset of the first output. The method includes directing, by the machine learning engine, a large language model to identify an archetype of the user-requested data transformation task. The method includes applying, by the large language model, the user-requested data transformation task to the subset of the first output using the archetype to generate a second output. The method includes displaying, by the machine learning engine, the second output.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 1C is a block diagram depicting an embodiment of output generated by a user engine interface in a system for dynamically generating a plurality of machine learning systems during processing of a user-specified data set;

FIGS. 3A-3M are block diagrams depicting embodiments of output generated by a user interface engine in a system for dynamically generating a plurality of machine learning systems during processing of a user-specified data set;

DETAILED DESCRIPTION

The methods and systems described herein may provide functionality for dynamically generating a plurality of machine learning systems during processing of a user data set and for automatically generating and executing computer code using a natural language description of a data manipulation to be performed on a data set. In one aspect, the systems described herein provide functionality for creating, using, and deploying machine learning-based predictive models in a simplified, highly-automated manner requiring minimal user input or intervention.

The systems and methods described herein may be used in a variety of applications, including, without limitation, fraud detection, likelihood to churn, next best action, predictive maintenance, customer support issue identification, automated issue/ticket tagging, and so on. Similarly, the systems and methods described herein may be used to process and generate output regarding a variety of types of input data, including audio, video, images, data sequences, and more. By way of example, and without limitation, the methods and systems described herein may provide functionality allowing a user to create and use a lead-scoring application for business sales pipeline automation by (1) uploading a dataset that contains information about their historical sales activity, such as a table of information with one or more fields such as win/loss, deal size, duration, company industry, etc., (2) choosing a field to predict from a drop-down menu, and (3) inputting data to predict into the resulting model either by direct entry, batch upload, or via API.

Figure 1A:
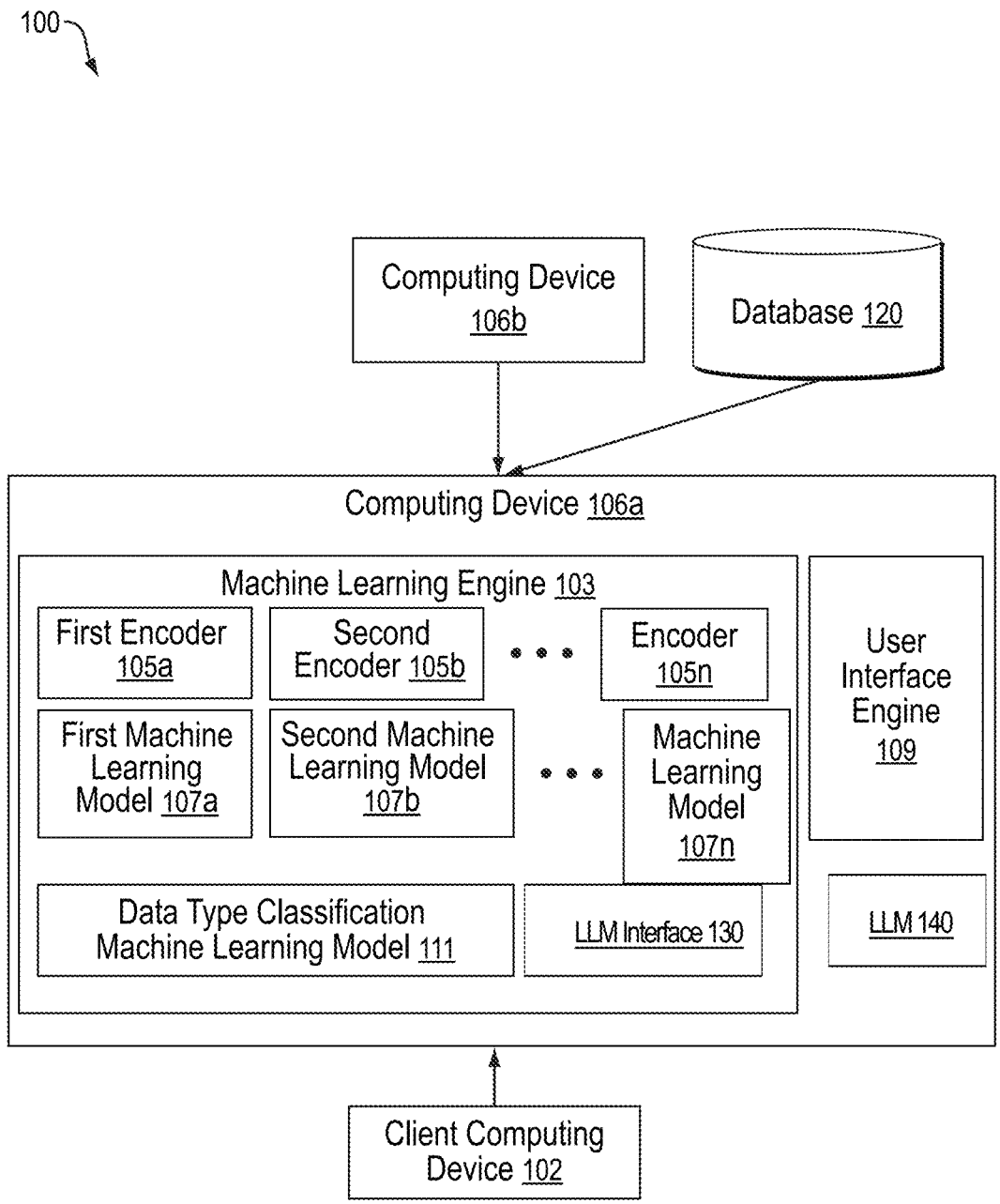
FIG. 1A is a block diagram depicting an embodiment of a system for dynamically generating a plurality of machine learning systems during processing of a user-specified data set.

Referring now to FIG. 1A, a block diagram depicts one embodiment of a system 100 for dynamically generating a plurality of machine learning systems during processing of a user data set. In brief overview, the system 100 includes a computing device 106a, a computing device 106b, a client computing device 102, a machine learning engine 103, a first encoder 105a, a second encoder 105b, a first machine learning model 107a, a second machine learning model 107b, a user interface 109, a data type classification machine learning model in, and a database 120. The computing devices 106a, 106b, and 102 may be a modified type or form of computing device (as described in greater detail below in connection with FIGS. 4A-4C) that have been modified to execute instructions for providing the functionality described herein; these modifications result in a new type of computing device that provides a technical solution to problems rooted in computer technology, such as generation of new machine learning engines during processing of a user-provided data set. The system 100 may be deployed in an on-premise fashion. The system 100 may execute on a compute platform (e.g., at the edge of a computer network) and provide access to users associated with one or more computing devices 102 that are located remotely from the computing device 106a of the system 100.

The machine learning engine 103 may be provided as a software component. The machine learning engine 103 may be provided as a hardware component. The computing device 106a may execute the machine learning engine 103. The machine learning engine 103 may include functionality for identifying one or more machine learning model architectures which, after training, maximize the accuracy of a task, such as a user-specified task. The machine learning engine 103 may include functionality for generating machine learning models. The machine learning engine 103 may include functionality for identifying one or more methods for encoding user data. The machine learning engine 103 may provide the functionality of a neural architecture search engine. The machine learning engine 103 may provide the functionality of a neural architecture search system.

The system 100 may include a plurality of encoders 105a-n. The encoders 105a-n may be part of the machine learning engine 103. Encoders may include text encoders, such as, without limitation, word2vec style word embeddings or transformer text encoders. Encoders may include sequence encoders, such as, without limitation, Fourier transform encoders or signature transforms or a neural network that has learned a sequence embedding "positional encoding" for dates or numbers (e.g., encoded(x)=sin(ax) for some set of numbers a). Encoders may include convolutional neural network (CNN) image encoders. Encoders may include CNN audio encoders. The machine learning engine 103 may include or have access to a machine learning model for selecting an encoder to use with a particular data set.

The system 100 may include a plurality of machine learning models 107a-n.

The system 100 may include a data type classification machine learning model in.

The system 100 may include a large language model (LLM) 140. The system 100 may include an LLM interface 130. The LLM interface 130 may provide functionality with which the machine learning engine 103 may communication with the LLM 140.

The computing device 106a may include or be in communication with the database 120. The database 120 may store data related to user-specified data sets, for example. The database 120 may be an ODBC-compliant database. For example, the database 120 may be provided as an ORACLE database, manufactured by Oracle Corporation of Redwood Shores, CA. In other embodiments, the database 120 can be a Microsoft ACCESS database or a Microsoft SQL server database, manufactured by Microsoft Corporation of Redmond, WA. In other embodiments, the database 120 can be a SQLite database distributed by Hwaci of Charlotte, NC, or a PostgreSQL database distributed by The PostgreSQL Global Development Group. In still other embodiments, the database 120 may be a custom-designed database based on an open source database, such as the MYSQL family of freely available database products distributed by Oracle Corporation of Redwood City, CA. In other embodiments, examples of databases include, without limitation, structured storage (e.g., NoSQL-type databases and BigTable databases), HBase databases distributed by The Apache Software Foundation of Forest Hill, MD, MongoDB databases distributed by 10Gen, Inc., of New York, NY, an AWS DynamoDB distributed by Amazon Web Services and Cassandra databases distributed by The Apache Software Foundation of Forest Hill, MD. In further embodiments, the database 120 may be any form or type of database.

Although, for ease of discussion, the machine learning engine 103, the first encoder 105a, the second encoder 105b, the first machine learning model 107a, the second machine learning model 107b, the user interface engine 109, the data type classification machine learning model nil, and the database 120 are described in FIG. 1A as separate modules, it should be understood that this does not restrict the architecture to a particular implementation. For instance, these components may be encompassed by a single circuit or software function or, alternatively, distributed across a plurality of computing devices.

Figure 2:
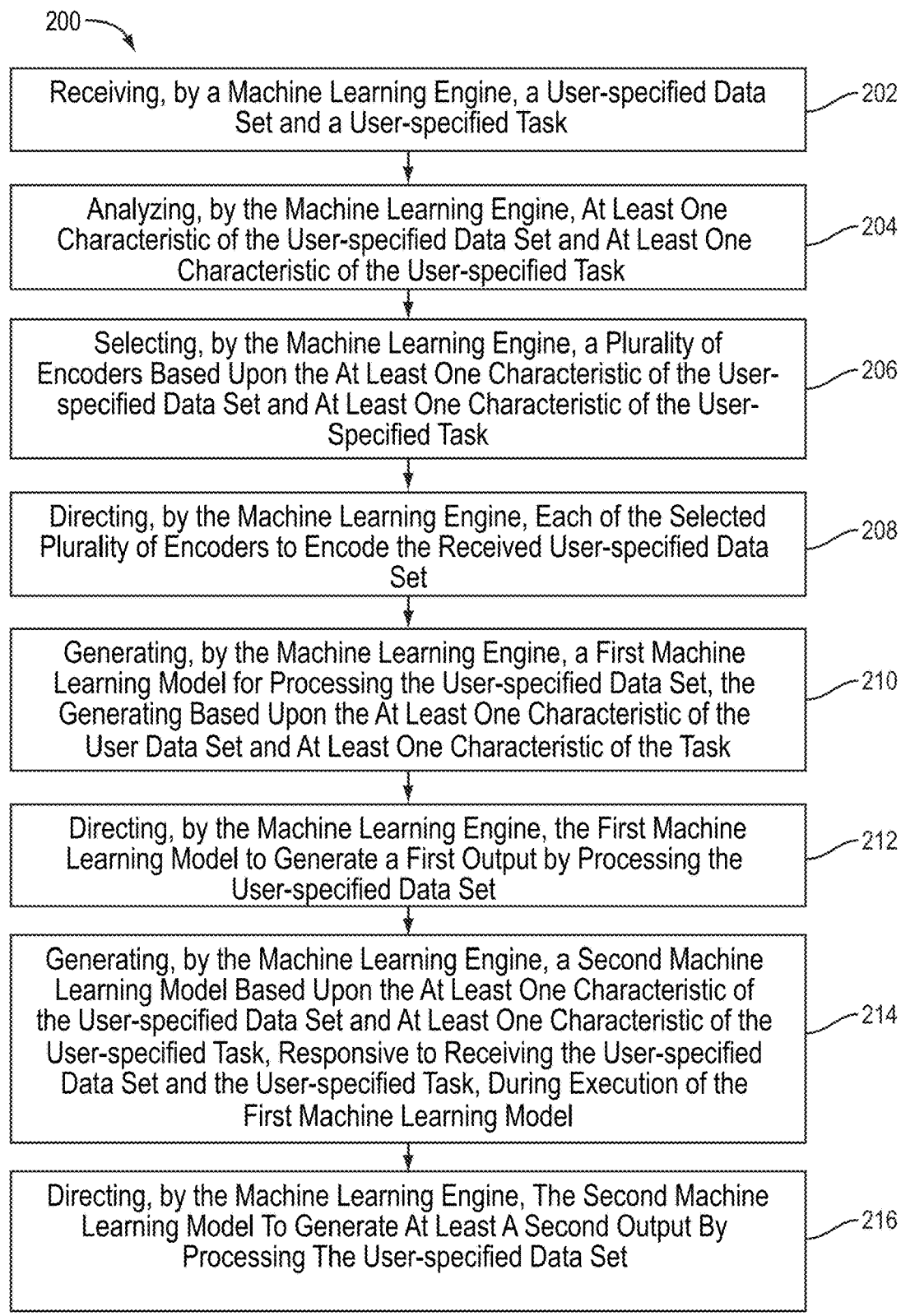
FIG. 2 is a flow diagram depicting an embodiment of a method for dynamically generating a plurality of machine learning systems during processing of a user-specified data set.

Referring now to FIG. 2, in brief overview, a block diagram depicts one embodiment of a method 200 for dynamically generating a plurality of machine learning systems during processing of a user data set. The method 200 includes receiving, by a machine learning engine, a user-specified data set and a user-specified task (202). The method 200 includes analyzing, by the machine learning engine, at least one characteristic of the user-specified data set and at least one characteristic of the user-specified task (204). The method 200 includes selecting, by the machine learning engine, a plurality of encoders based upon the at least one characteristic of the user-specified data set and at least one characteristic of the user-specified task (206). The method 200 includes directing, by the machine learning engine, each of the selected plurality of encoders to encode the received user-specified data set (208). The method 200 includes generating, by the machine learning engine, a first machine learning model for processing the user-specified data set, the generating based upon the at least one characteristic of the user data set and at least one characteristic of the task (210). The method 200 includes directing, by the machine learning engine, the first machine learning model to generate a first output by processing the user-specified data set (212). The method 200 includes generating, by the machine learning engine, a second machine learning model based upon the at least one characteristic of the user-specified data set and at least one characteristic of the user-specified task, responsive to receiving the user-specified data set and the user-specified task, during execution of the first machine learning model (214). The method 200 includes directing, by the machine learning engine, the second machine learning model to generate at least a second output by processing the user-specified data set (216).

Figure 1B:
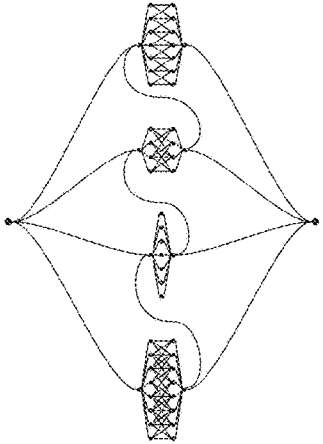
FIG. 1B is a block diagram depicting an embodiment of output generated by a user interface engine in a system for dynamically generating a plurality of machine learning systems during processing of a user-specified data set.
Figure 1C:
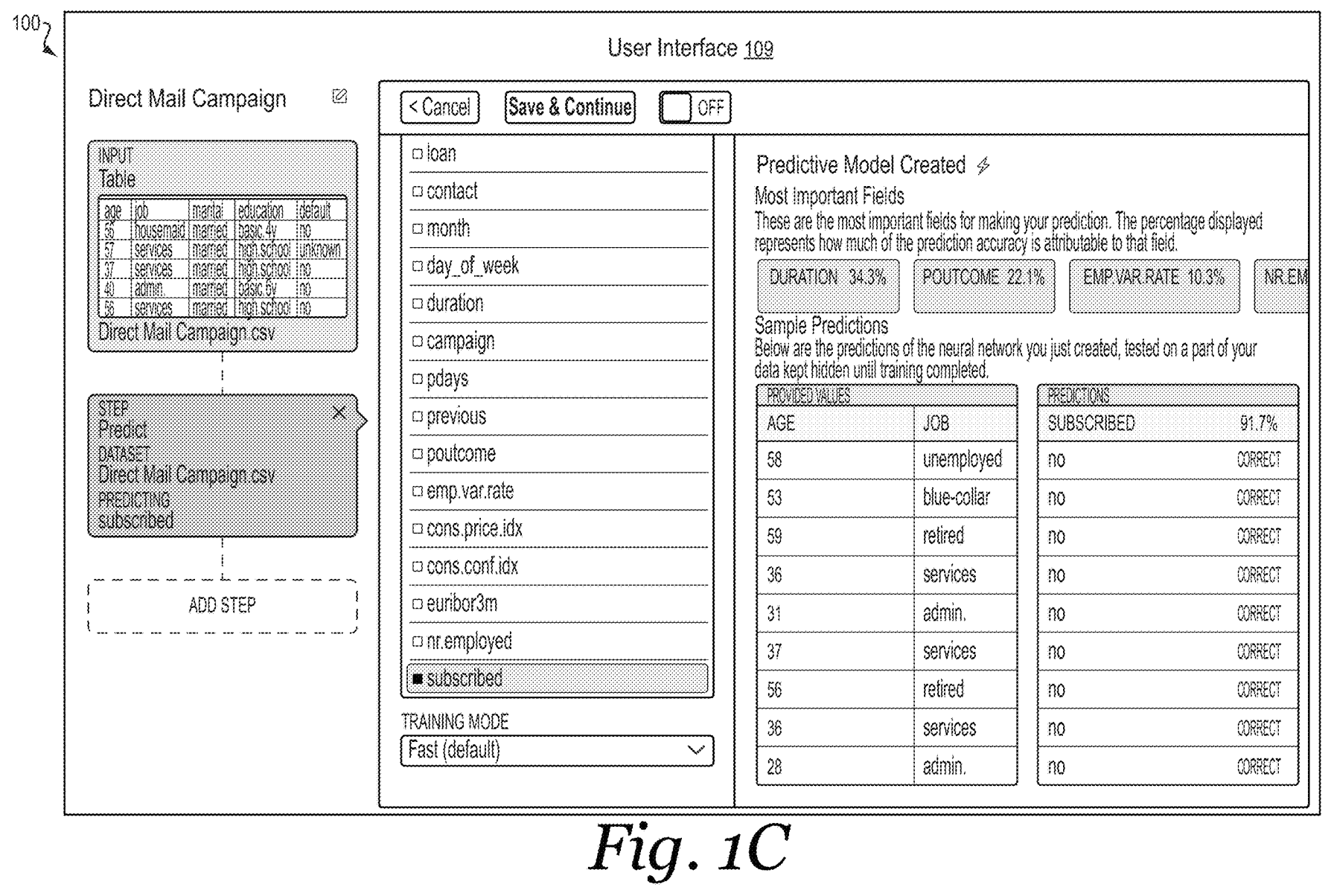

Referring now to FIG. 2, in greater detail and in connection with FIG. 1A-1C, the method 200 includes receiving, by a machine learning engine, a user-specified data set and a user-specified task (202). The machine learning engine 103 may receive the user-specified data set directly. The machine learning engine 103 may receive the user-specified data set indirectly. The machine learning engine 103 may receive the user-specified task directly. The machine learning engine 103 may receive the user-specified task indirectly.

The user interface engine 109 may receive the user-specified data set. The user interface engine 109 may receive a uniform resource link or other identifier of a network address for a computing device 106b storing the user-specified data set. The user interface engine 109 may receive the user-specified data task. The user interface engine 109 may store the user-specified data set in the database 120. The user interface engine 109 may store the user-specified task in the database 120. The machine learning engine 103 may retrieve the user-specified data set from the database 120. The machine learning engine 103 may retrieve the user-specified data set from a third party computing device 106b. The machine learning engine 103 may retrieve the user-specified task from the database 120.

The user interface engine 109 may provide one or more interface elements with which users can interact with the system and provide user-specified data sets and/or user-specified tasks; for example, the system 100 may provide a web-based user interface engine 109 with which the user may provide the user-specified data set and the user-specified task. A cloud-based implementation of the system 100 may include one or more user interface elements that include instructions guiding a user through one or more steps, from uploading a dataset the user has (including, e.g., choosing an existing dataset), to having the system create a predictive model based on that dataset, to having the system deploy that model such that a user can input new data and generate predictions on it. Data sets may be obtained through integrations with one or more third-party applications (e.g., a customer database may be selected through an authenticated connection to a user's account with Salesforce, G-Suite, Zendesk, etc.). The system 100 may include functionality allowing users to set up an API endpoint to programmatically pass data into a model with which to generate predictions; such a model may receive new information that allows the predictive model to learn and change over time (e.g., to improve its prediction accuracy by receiving back new results).

The system 100 may include functionality allowing users to combine multiple datasets or split or filter one or more datasets in a manner that facilitates creation of a prediction model. Such functionality may allow for efficiently joining very large datasets with imperfectly matching data, especially in embodiments in which efficiency is important because otherwise joining such datasets would be intractable. In one embodiment, a user can join, or merge, datasets without common unique identifiers using one or more artificial intelligence techniques, such as by executing a nearest-neighbor or similar clustering process in a learned metric space. The metric space embedding is learned by means of a masking variational autoencoder or other methods of metric learning. Execution of such functionality may result in matching columns using the structure of the data itself instead of labels (such as row or column labels) or other identifiers—by examining what values are shared or almost shared across the columns on which the system is trying to make matches, the system may identify and merge data even where there are no such labels. Therefore, the method 200 may include generating a search engine, including an index; populating the index with a plurality of user-specified data sets; querying the index to identify common data (e.g., data having the same value in each of two or more data sets) across the plurality of user-specified data sets; removing duplicate data across the plurality of user-specified data sets to generate de-duplicated data sets; and merging the de-duplicated data sets. In one embodiment, the index is an acceleration structure that allows the system to determine if a match exists between a given row and any other row in a given dataset.

The method 200 includes analyzing, by the machine learning engine, at least one characteristic of the user-specified data set and at least one characteristic of the user-specified task (204). When starting to work with a dataset, the machine learning engine 103 may identify a type of input data included in the user-specified data set; for example, and without limitation, the machine learning engine 103 may infer a data type for each column of data in a data set. The machine learning engine 103 may assign the input data type to the user-specified data set, which may aid in inputting the user-specified data set to one or more machine learning models 107. The machine learning engine 103 may identify one or more data types by applying heuristics, such as character or token frequency. The machine learning engine 103 may execute one or more machine learning models in trained to classify data into one of several data types (e.g., dates, names, unique IDs, Categories, and so on) in order to identify the type of input data included in the user-specified data set (e.g., by executing a data type classification machine learning model in shown in FIG. 1A). Other types of data characteristics include, without limitation, statistical properties of the dataset, such as distribution of values, appearance of values, name of values. The characteristics of the user-specified data set and of the user-specified task may be features of the data and of the task that are useful in completing tasks—for example, without limitation if the task involves prediction (such as sales in a future year based on sales in a prior year), the characteristics may be features that are known to influence accuracy of machine learning models trained to make predictions.

The method 200 includes selecting, by the machine learning engine, a plurality of encoders based upon the at least one characteristic of the user-specified data set and at least one characteristic of the user-specified task (206). In some embodiments, the machine learning engine 103 may include or have access to a machine learning model executed to select an encoder for use with a particular data set. In some embodiments, instead of the machine learning engine 103 selecting the plurality of encoders 105a-n, a user selects one or more of the plurality of encoders 105a-n. The method 200 may include using an inferred data type (as described above) in selecting the plurality of encoders 105a-n. Characteristics may include information identifying features of the data such as what kind of data the data is—e.g., text, numbers, dates, images, etc.

To prepare data for use by one or more generated machine learning models 107*a-n*, the data may be compressed before training, which may speed up the training, with a larger advantage on bigger datasets; for example, in data sets that include repetitive data, compressing such data may accelerate model training of the machine learning model. By way of example, a relatively small number of samples can "stand in" for the entire dataset by being representative examples, thus saving much training time. This data distillation may be accomplished by minimization of the mutual information across the dataset samples as well as the construction of synthetic samples ('archetypal samples'), which may stand in for multiple natural samples.

The method 200 includes directing, by the machine learning engine, each of the selected plurality of encoders to encode the received user-specified data set (208). The encoders here may transform the data from one format to another—for example, from user provided strings such as "I want help" or "7.2" to numerical representations that are amenable to processing by machine learning models.

The method 200 includes generating, by the machine learning engine, a first machine learning model for processing the user-specified data set, the generating based upon the at least one characteristic of the user data set and at least one characteristic of the task (210). The machine learning engine 103 may then train the generated machine learning model. The first machine learning model 107*a* may be a neural network. The first machine learning model 107*a* may be a machine learning model other than a neural network. For example, the machine learning model 107*a* may be a Gradient Boosted Decision Tree, a radial basis function, a K-nearest neighbor (KNN) model, or other machine learning model. To generate the machine learning model 107*a*, a novel approach to efficient neural architecture search may be implemented: by means of executing a neural architecture search to progressively build model ensembles (e.g., to generate a plurality of machine learning models 107*a-n*), the expressiveness of the neural architecture is scaled until it reaches the expressivity critical threshold wherein it can fit the target function.

In some embodiments, the machine learning engine 103 executes a method for training the machine learning model 107, the method including training, by the machine learning engine, the machine learning model using a first training data set; selecting, by the machine learning engine, a second training data set including corrupted data and having a level of data corruption selected using a metalearning process, based on at least one characteristic of the first training data set, and based on an architecture of the machine learning model (metalearning may also be referred to as "learning to learn" and may refer to a recursive learning process whereby the system not only optimizes a specific model but also optimizes how that model is generated, and potentially that feedback process as well, and so on); training, by the machine learning engine, the machine learning model using the second training data set including corrupted data; evaluating, by the machine learning engine, a level of accuracy of the machine learning model using a third training data set; and determining, by the machine learning engine, that the level of accuracy satisfies a threshold level of accuracy. The corrupted data may include at least one simulated clerical error. The method may include generating, by the machine learning engine, using the trained machine learning engine, at least one sample prediction; and providing, by the machine learning engine, to a user, an application programming interface with which to access the trained machine learning model. The method may include training, by the machine learning engine, a machine learning model using a first training data set; training, by the machine learning engine, the machine learning model using a second training data set including hidden data unavailable to the machine learning model; and determining, by the machine learning engine, that the level of accuracy satisfies a threshold level of accuracy.

Referring to FIG. 1B, a block diagram depicts an embodiment of output generated by a user interface engine 109. As shown in FIG. 1B, the user interface engine 109 may provide an indication of a status of the execution of the method 200. As shown in FIG. 1B, the user interface engine 109 indicates that a machine learning model has been generated (a neural network in this example) and is being trained.

Referring back to FIG. 1A, in one embodiment, the method 200 includes generate a machine learning model that is capable of learning different types of functions. Such basis functions may include primitives, such as, without limitation, matrix multiplication, sparse matrix multiplication, normalization, and others.

In some embodiments, the method 200 includes receiving, by the machine learning engine, an identification of an amount of time to spend on training a generated machine learning model 107. In one such embodiment, the method 200 selects the amount of time to spend on training the generated machine learning model 107 and allows a user to optionally spend more time in training after they receive an initial set of results.

The method 200 includes directing, by the machine learning engine, the first machine learning model to generate a first output by processing the user-specified data set (212).

The method 200 may include identifying one or more ranges, or buckets, to simplify machine learning model outputs when predicting numbers. Several prior distributions may be assumed and compared for best fit; buckets may be determined as the threshold wherein a target percentage (say 85%) of the probability mass is within the bucket. As an example, a single prediction may be a point estimate while the actual data is a distribution. The method 200 may display to a user (e.g., via a user interface generated by the user interface engine 109) a predicted range for a numerical result instead of an exact value for a numerical prediction. As an example, if the predictive machine learning model can correctly predict a numerical outcome within a range (like, between 100 to 110) it may display that range instead of the predicted number itself.

The method 200 includes generating, by the machine learning engine, a second machine learning model based upon the at least one characteristic of the user-specified data set and at least one characteristic of the user-specified task, responsive to receiving the user-specified data set and the user-specified task, during execution of the first machine learning model (214). The second machine learning model 107*b* may be a machine learning model other than a neural network. In some embodiments, the method 200 includes generating, by the machine learning engine, a second machine learning model based upon the at least one characteristic of the user-specified data set and at least one characteristic of the user-specified task, responsive to receiving the user-specified data set and the user-specified task, subsequent to execution of the first machine learning model.

The method 200 includes directing, by the machine learning engine, the second machine learning model to generate at least a second output by processing the user-specified data set (216). The method 200 may include directing, by the machine learning engine, the second machine learning model to determine a residual of the first output.

There may be certain functions that neural networks (and/or radiant boosted learning trees and/or gradient boosted decision trees) cannot learn without special additions (e.g., feature engineering). Functions that are periodic in nature are one example of this, although they are useful in predicting seasonality of sales, etc. In one embodiment, the method 200 includes formulating, by the machine learning engine 103, the data in a way that increases a level of efficiency in generating a machine learning model 107 that has a higher level of accuracy, for example, by generating a machine learning model 107 that is better suited to completing one type of task over another. Therefore, in some embodiments, implementation of a method that includes generating and executing a plurality of machine learning models, each of which is suited to completing different types of tasks, increases a level of accuracy of the output.

The method 200 may include providing, by the machine learning engine 103, access to at least one of the first output and the second output. The machine learning engine 103 may dynamically update data displayed to a user in a user interface to include to at least one of the first output and the second output. Alternatively, the machine learning engine 103 may instruct the user interface engine 109 to dynamically update data displayed in a user interface. The user may see information about the quality of the model generated, such as an accuracy score.

Referring now to FIG. 1C, a block diagram depicts an embodiment of output generated by the user engine interface 109. As shown in FIG. 1C, the user interface engine 109 may display to a user an indication that the system 100 generated a predictive machine learning model. The user may see a sampling of the validation data. Additionally, the user may see a section identifying the "Most Important Fields," which provides information about what factors or variables were most important, or had the most predictive power in determining outcomes for the model with this dataset. As part of generating the machine learning prediction model 107, the most important factors for the predictive power of that model can be identified. As an example of this, and as shown in FIG. 1B, if "duration" and "poutcome" are the two most important fields for a particular prediction model 107, those two fields may be shown to the user. The method may include execution of a sensitivity analysis of input variables to machine learning model predictions by using various sensitivity analysis methods, such as field ablation and direct modeling of the conditional probability distribution. In one embodiment, the method 200 includes removing a portion of the user-specified data set (e.g., a column of data identified as a particular "field"); directing the plurality of machine learning models to process the data set again; comparing a second set of output from each of the plurality of machine learning models with at least the second output; determining a level of impact the removal of the portion of the user-specified data set had on the output; determining that the determined level of impact exceeds a threshold level of impact; labeling the removed portion (e.g., as "important"), based upon the determination that the determined level of impact exceeds a threshold level of impact; and providing an identification of the labeled portion to a user. For example, the method 200 may include analyzing an amount by which the models' results changed due to a particular factor, normalized by the amount the input varies on the whole population—that is, analyzing the variance of the gradient of the loss per input channel, normalized by the variance on the input channel. As another example, the method 200 may include taking the variance gradient of the loss with respect to the input fields, normalized by the variance of those input fields.

Referring back to FIG. 1A, in some embodiments, the machine learning engine 103 determines that the second output has a higher level of accuracy than the first output and only displays the second output. In other embodiments, the machine learning engine 103 determines that the first output has a higher level of accuracy than the second output and only displays the first output—for example, and without limitation, in one such embodiment, the machine learning engine 103 may have executed the method 200 to generate the first output and second output and then generated a third machine learning model 107c to generate a third output but the machine learning engine 103 may determine that the third output has a lower level of accuracy than the second output and determines, as a result, to display the second output not the third output. In other embodiments, the method 200 may include executing one or more regression tests against earlier models to ensure a threshold level of accuracy.

In one embodiment, therefore, the method 200 may include identifying an input data type of the user-specified data set, distilling data to essential elements, generating one or more machine learning models, and deploying the generated machine learning model for use in completing one or more user-specified tasks (e.g., by deploying the machine learning model to a cloud-based interface or to an on-premise machine, or to an edge network computing device).

In one embodiment, the methods and systems described herein provide functionality for end-to-end machine learning model generation, in which a user provides data, or an authenticated link to data, selects a task to complete (e.g., what they want the system to predict), and the generation of the one or more machine learning models needed to complete the tasks and the completion of such tasks occurs automatically (e.g., without human intervention), in real-time—that is, after the user has provided the data and requested completion of the task and while the user is waiting. Therefore, in some embodiments, a method for dynamically generating a plurality of machine learning models for processing a user data set includes receiving, by a machine learning engine, a user-specified data set and a user-specified task; analyzing, by the machine learning engine, at least one characteristic of the user-specified data set and at least one characteristic of the user-specified task; selecting, by the machine learning engine, a plurality of encoders based upon the at least one characteristic of the user-specified data set and at least one characteristic of the user-specified task; directing, by the machine learning engine, each of the selected plurality of encoders to encode the received user-specified data set; generating, by the machine learning engine, after receiving the user-specified data set, at least one machine learning model for processing the user-specified data set, the generating based upon the at least one characteristic of the user data set and at least one characteristic of the task; and directing, by the machine learning engine, the at least one machine learning model to generate a first output by processing the user-specified data set.

Referring now to FIGS. 3A-3M and 1B-1C, block diagrams depict embodiments of output generated by user interface engines in a system for dynamically generating a plurality of machine learning systems during processing of a user-specified data set, using as an example data provided by a client for use in a direct mail campaign prediction task.

Figure 3A:
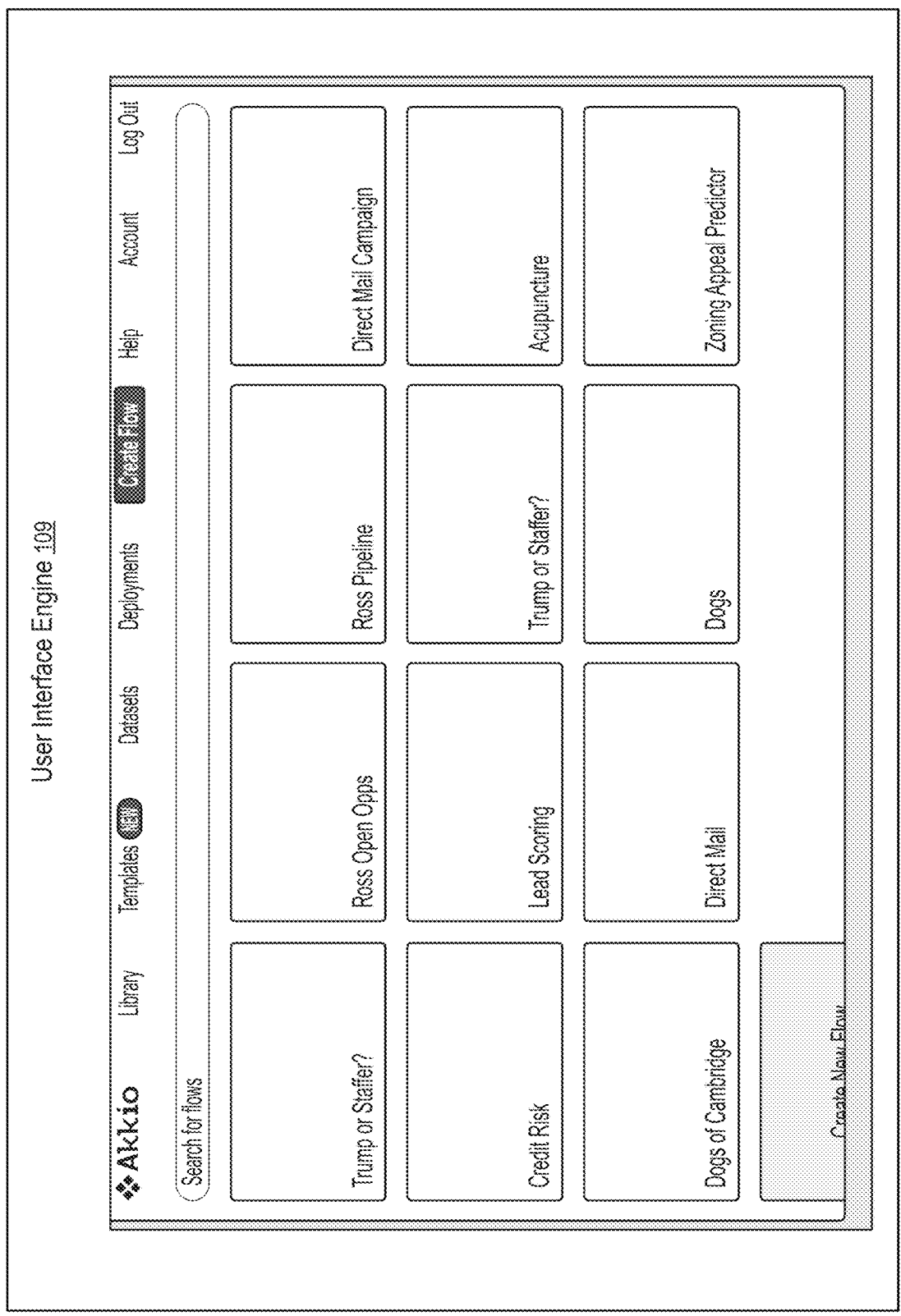

As shown in FIG. 3A, a Flow Home Page allows a user to view and search for a "Flow", which may refer to a workflow executed to train and deploy a machine learning model 107. The user may either select a Flow they've already created or create a new Flow (by selecting "Create New Flow" or "Create Flow"). In another embodiment, a user may choose to start from a template—a Flow that has already been created—and they can replace the data and choices made in the template with their own to create a Flow.

Figure 3B:
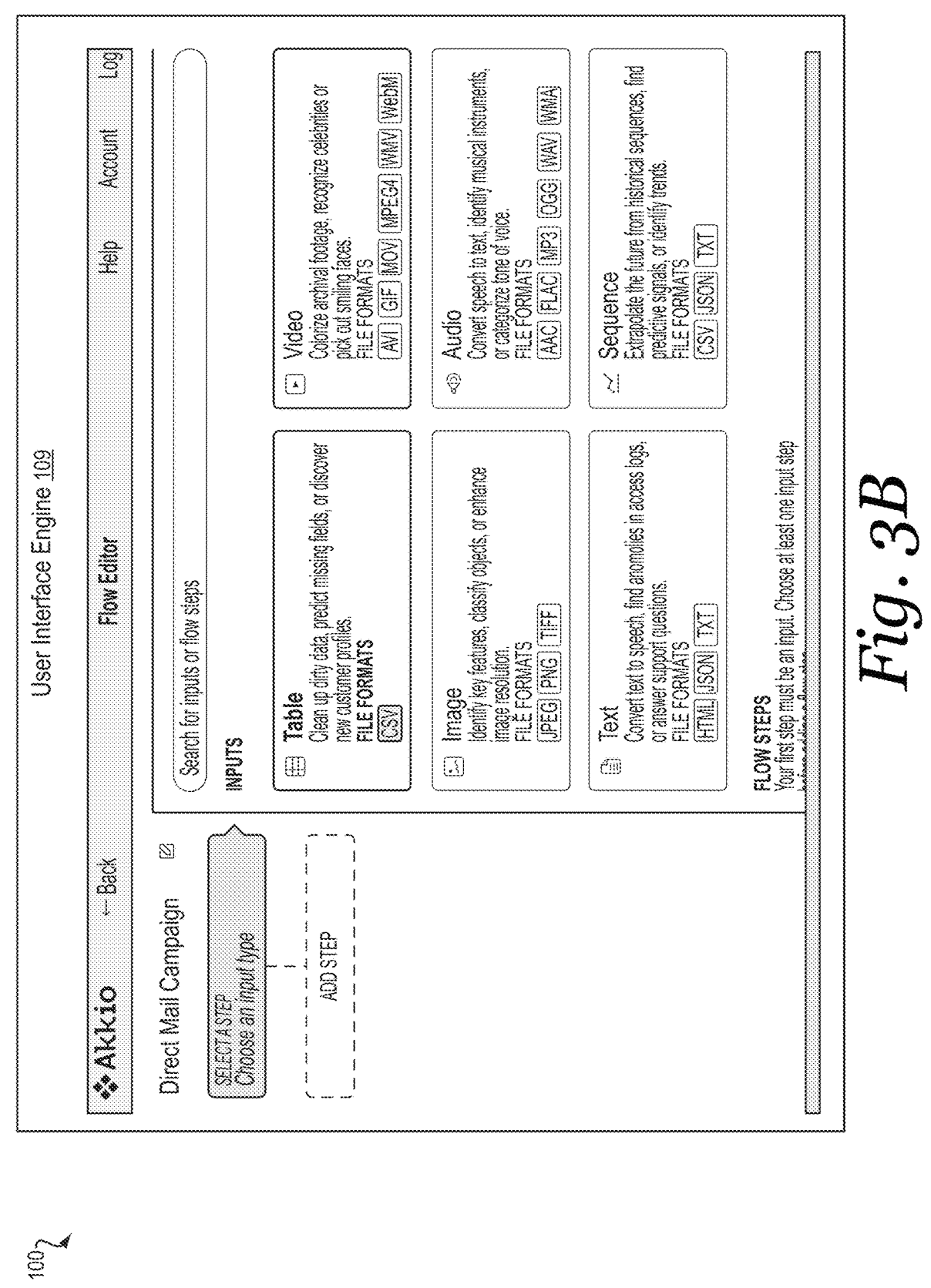

As shown in FIG. 3B, an Input Type Selection page allows a user to select an input type of a dataset they'd like to work with. On the left bar, they may see a visual representation of the steps, or Flow, they're building. The data types may include tables, text, images, audio, video, sequences, and more.

Figure 3C:
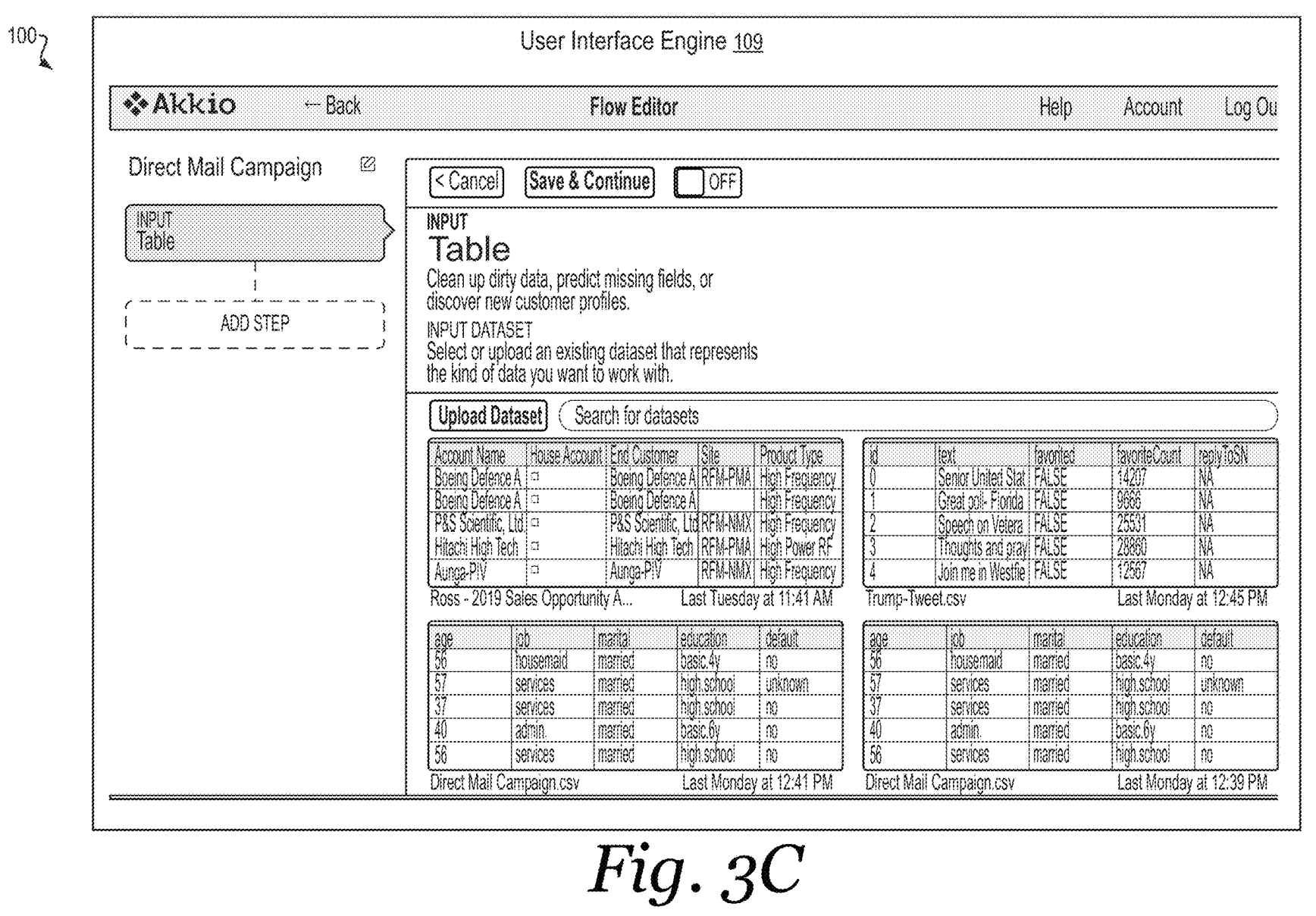

As shown in FIG. 3C, a Data Selection page allows a user to search for and/or select a dataset to work with or upload a new dataset.

As shown in FIG. 3D, a Field Types page allows a user to see and interact with the dataset they're working with. In the header for each field, they can see the title of the field. They can also see a label that has automatically been applied to the data in that field. The system 100 may analyze the data in a field and determines what type of data it is. For instance, the system 100 may determine if the column contains a collection of numbers, unique IDs, dates, text, categories, or names and so on, using this determination of the data type in later steps.

Figure 3E:
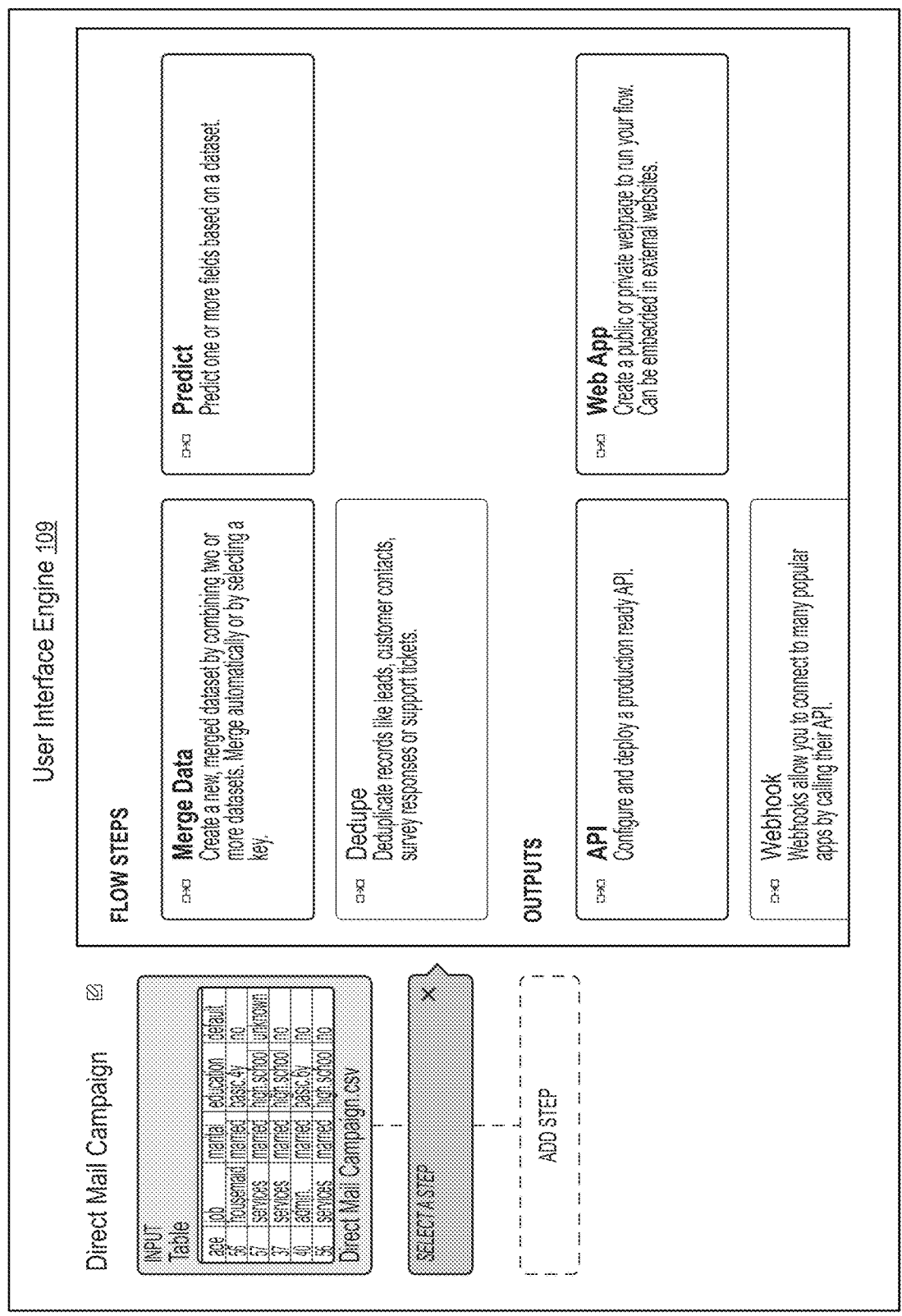

As shown in FIG. 3E, a Flow Steps and Output Selection page, a user selects the next Flow Step to apply to their dataset. For instance, here, a user can choose to Merge multiple datasets together, Dedupe data in a dataset, or Predict to create a prediction machine learning model 107 based on the dataset. Other Flow Steps can include actions such as splitting or filtering a dataset, cleaning up messy or incomplete data, and/or applying Flow Steps that better connect data to programmatic updates via an integration or API.

As shown in FIG. 3F, a Predict Screen page allows a user to view the various fields that they can request the system 100 to predict. As shown in FIG. 3F, users may select one or more fields to predict.

Figure 3G:
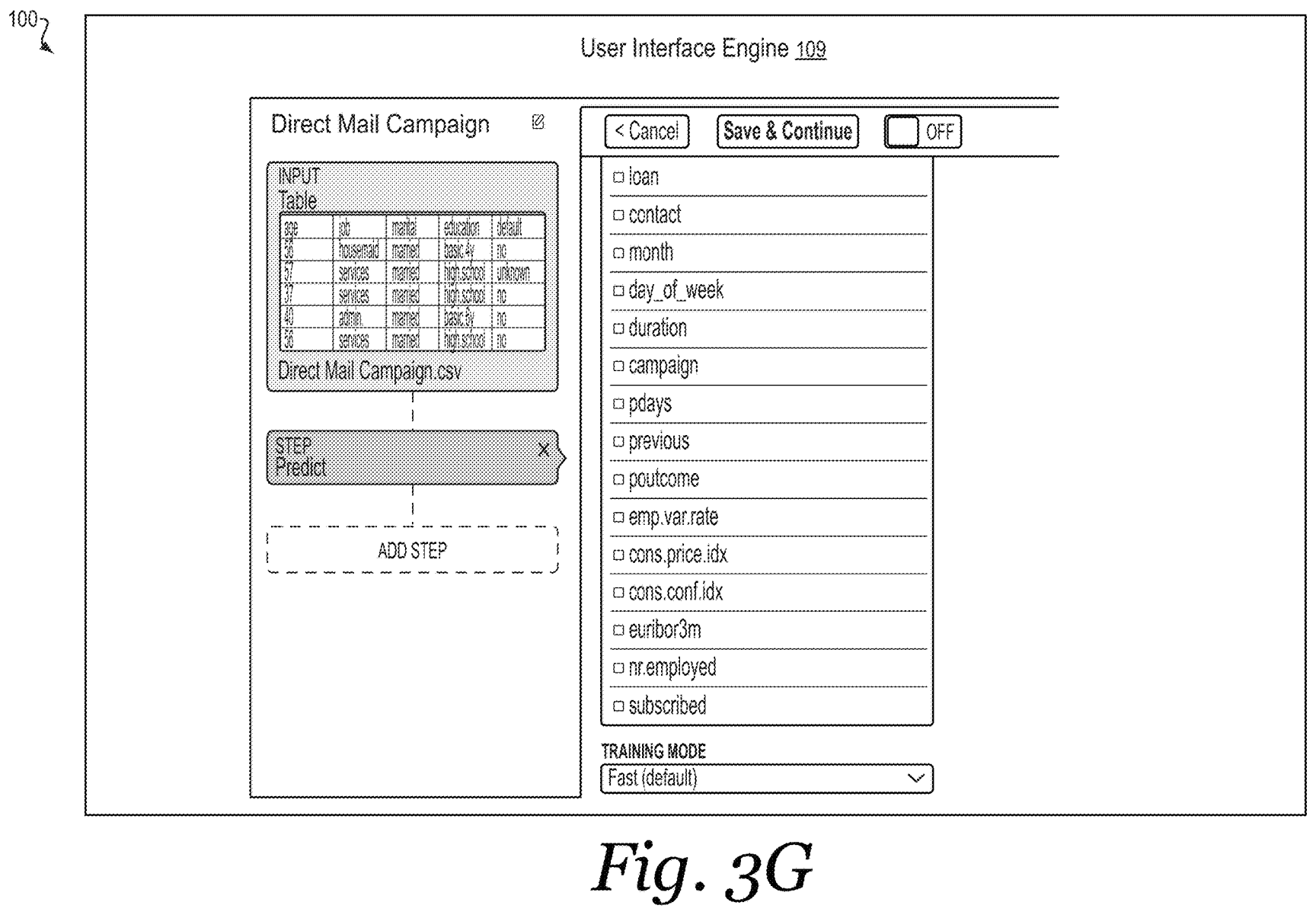

As shown in FIG. 3G, a user may select a Training Mode. For instance, they may select "Fast (default)" as shown here, or other speeds or types of training in the drop down menu, such as "High Quality" or "Best Quality".

Figure 3H:
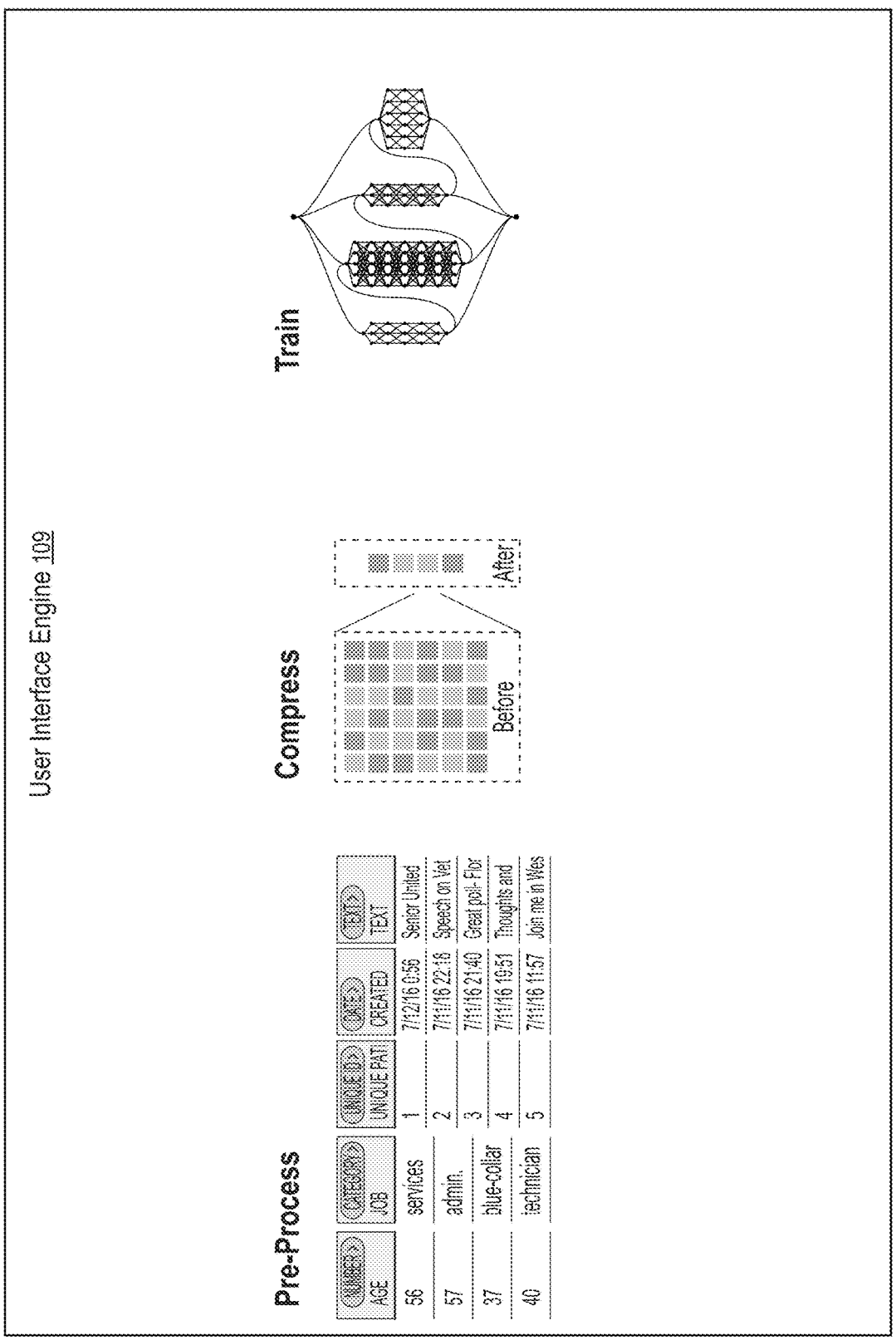

As shown in FIG. 3H, a Compress Step occurs. Datasets may include repetitive data. The system 100 may include functionality for compressing the data before executing a training process, creating a brief representation of the data; this may decrease an amount of time taken to complete the training process, with a larger advantage on bigger datasets.

As shown in FIG. 1B above, a Neural Network Training page allows a user to view a status of the executing method as the dataset is encoded, a machine learning model 107 is selected and/or built, and as the machine learning model 107 trains.

As shown in FIG. 1C above, a "Predictive Model Created" page allows a user to view that they've successfully created a predictive model. They may view information about the quality of the model they've built, such as an accuracy score. They may view a sampling of the validation data. Additionally, they may view the "Most Important Fields", which displays information about what factors or variables were most important, that is, which had the most predictive power in determining outcomes for the model with this dataset.

Figure 3I:
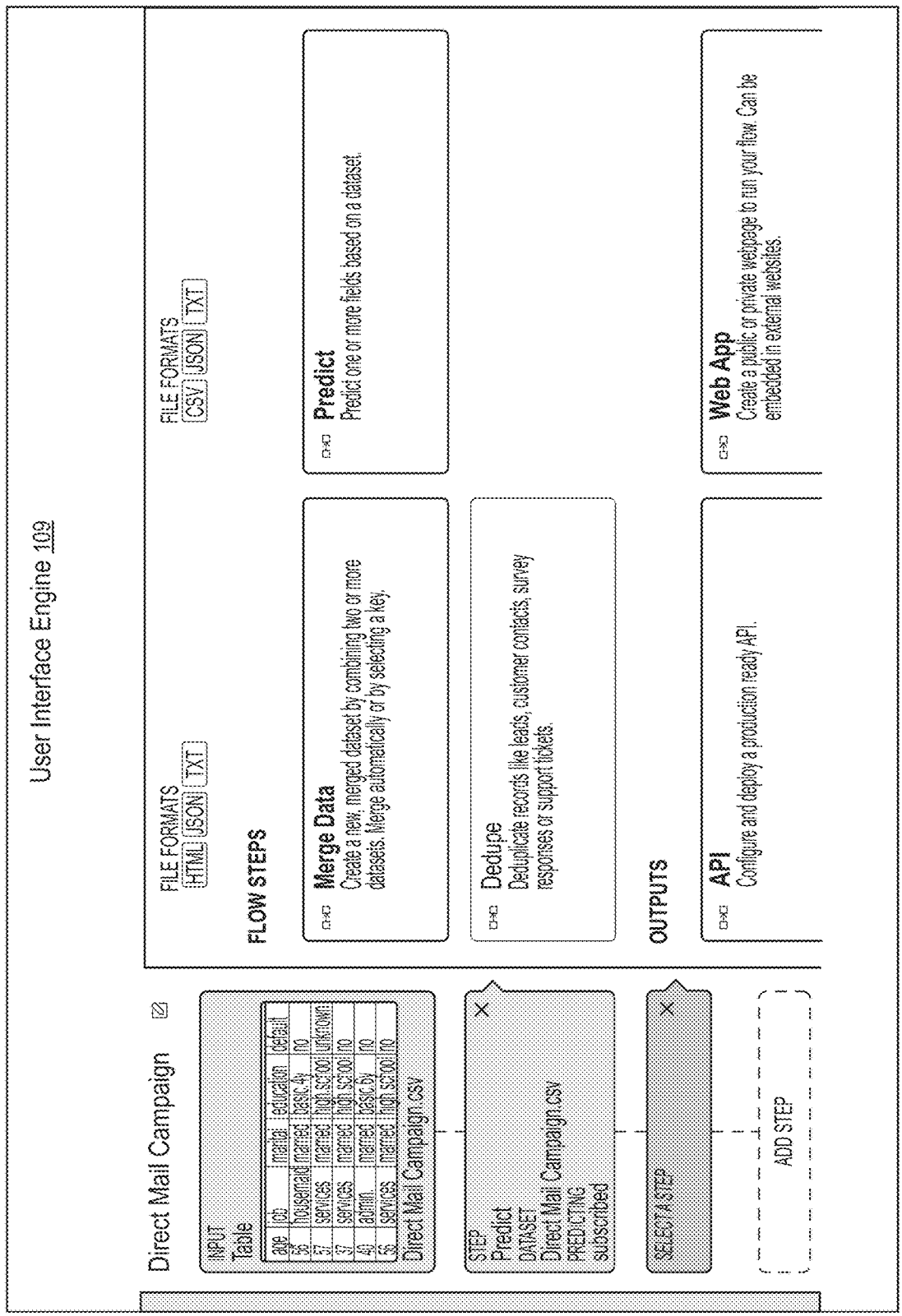

As shown in FIG. 3I, an Output Flow Step occurs. A user may select how to interact with the generated model 107. The user may choose "API" to configure, deploy, and pass data in and out of the model 107 programmatically with an API. The user may select "Web App" to interact with the model 107 through a webpage.

Figure 3J:
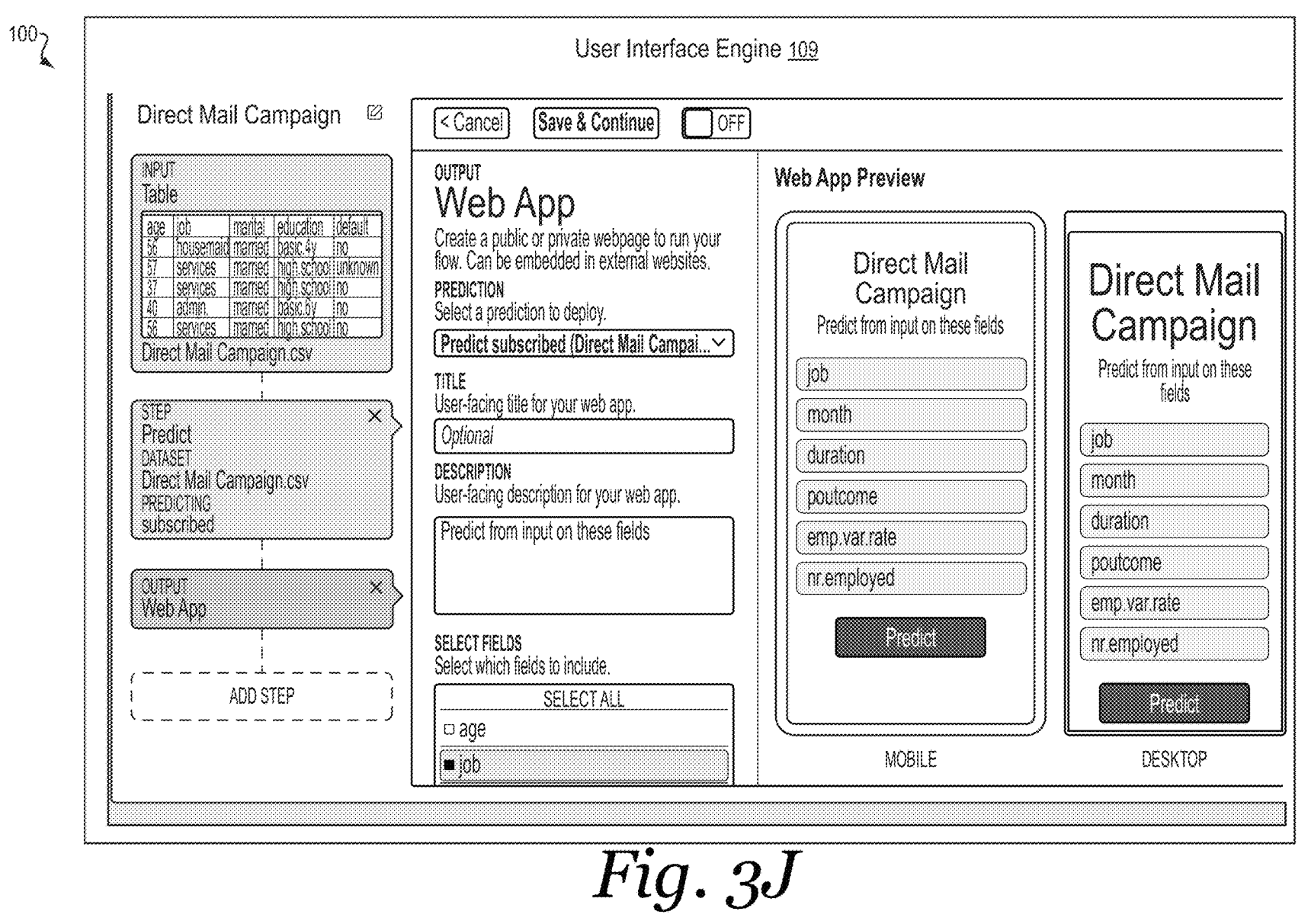
Figure 3K:
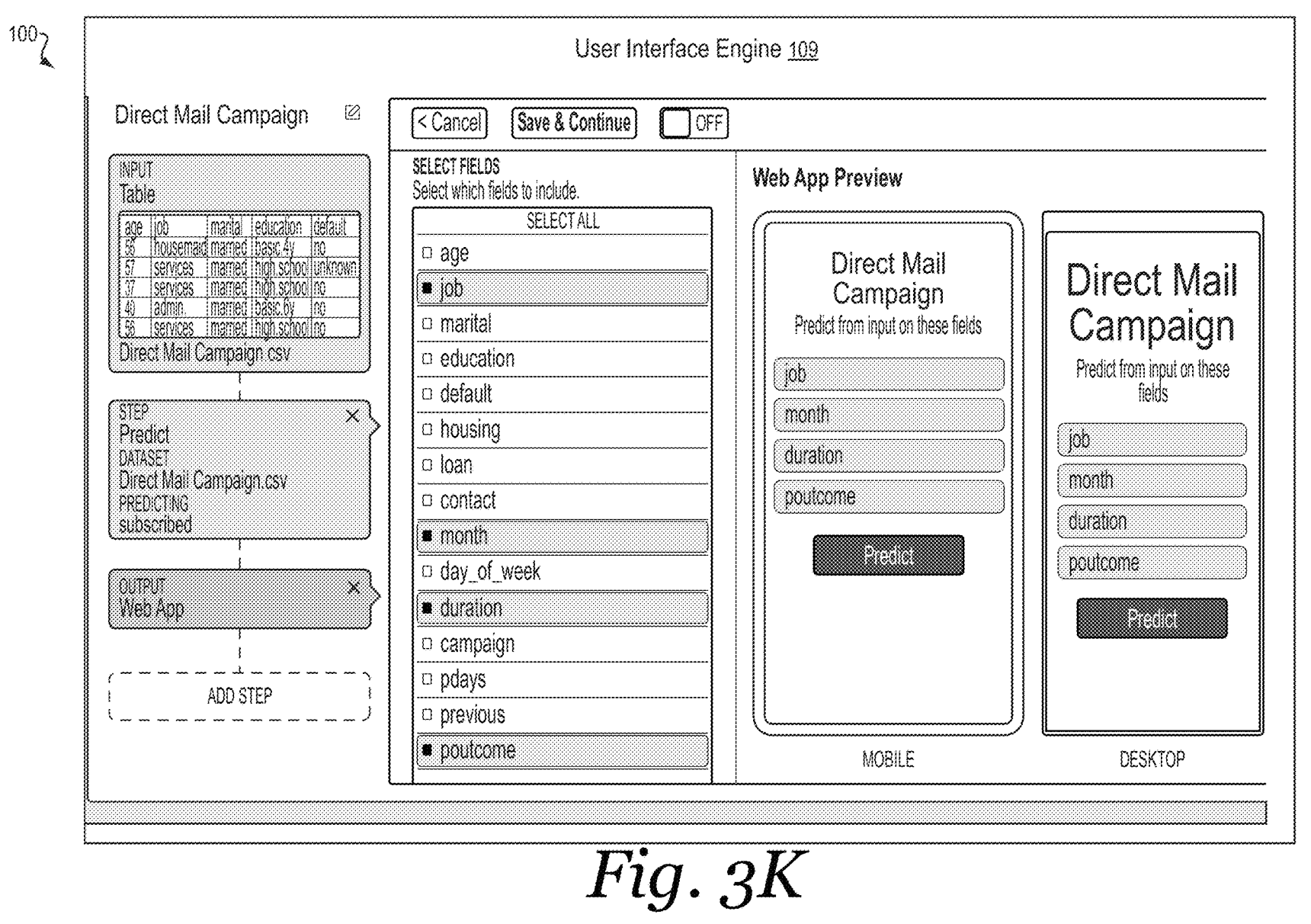

As shown in FIG. 3J, a Web App Output page shows a user how their web app will appear in desktop and mobile applications. The user may title the page, write descriptions, and (as shown in FIG. 3K) select fields to include in the web app. In one embodiment, the "Most Important Field" data may be used to automatically only show fields in a web app (or API integration) that are important to the output of a model 107. The user may also choose to allow a bulk upload—in which case the deployment will accept a dataset as an input (such as a spreadsheet or comma-separated values file) and automatically fill in predictions into that dataset.

Figure 3L:
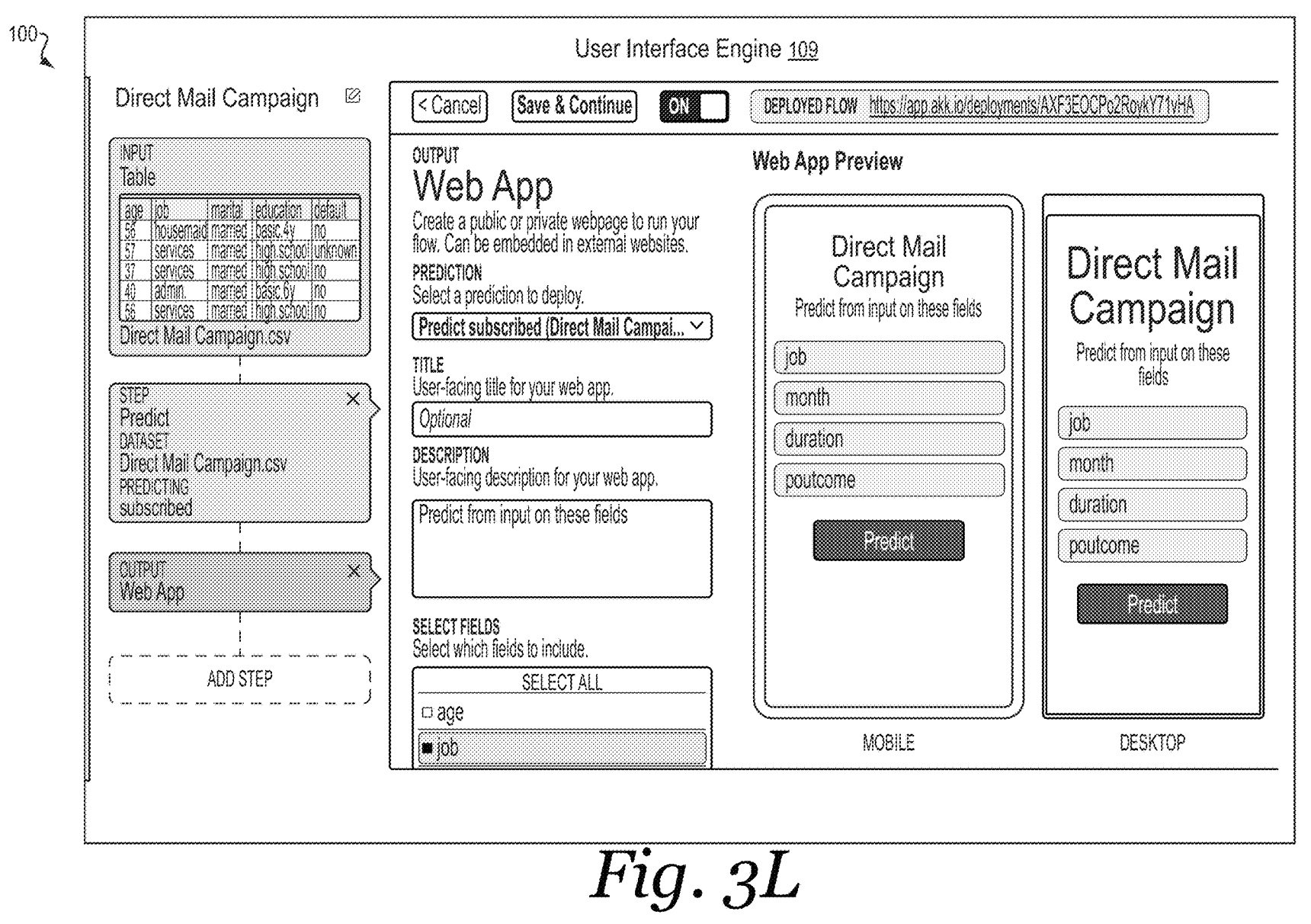

As shown in FIG. 3L, a Deploy Link page allows a user to deploy the flow, or in the embodiment depicted by FIG. 3L the web app, by selecting a button (or slider or similar user interface element). As shown in FIG. 3L, turning the slider "on" deploys the flow in a web app whose link is available at the top of the page.

Figure 3M:
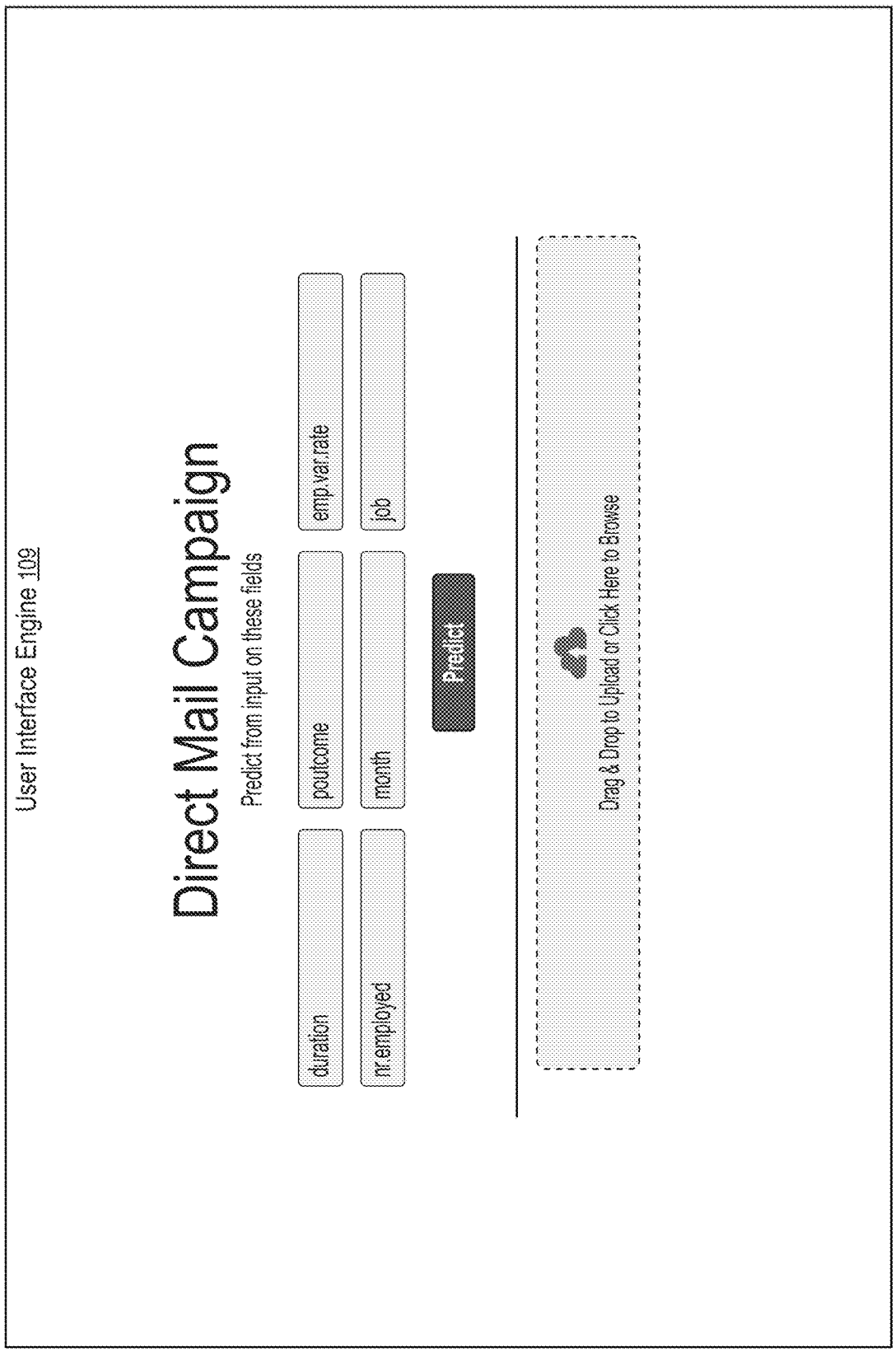

As shown in FIG. 3M, a Prediction App page allows a user to input data into the prediction model—either by typing it in or by batch uploading a dataset to predict. Clicking the "predict" button will run the machine learning model against the input and return the prediction to the user.

Therefore, the methods and systems described herein may provide functionality for dynamically generating a plurality of machine learning systems during processing of a user data set. Such methods and systems may provide functionality for creating, using, and deploying machine learning-based predictive models in a simplified, highly-automated manner requiring minimal user input or intervention. Implementations of the methods and systems described herein provide functionality that when executed may provide substantially similar performance in terms of accuracy of the machine learning models than conventional systems while operating two orders of magnitude faster than conventional systems (e.g., training the machine learning models in about one minute as opposed to one or two hours). Unlike conventional methods, the methods and systems described herein provide functionality for generating machine learning models (including, without limitation, predictive models) after receiving at least one user-specified data set and user-specified task, selecting encoders based on the user-specified data set and the user-specified task, encoding the data with the selected encoders, and then generating (not merely selecting from a library, but generating) at least two machine learning models based on characteristics of at least the user-specified data set and of the user-specified task. This is in contrast to conventional systems and methods, which do not typically wait to generate models until after they have received the data and encoded it, and which do not typically select the encoders and the machine learning models to generate and train based on characteristics of both tasks and data, and which do not typically perform such selection, generation, training, and execution in real time, while a user waits for results. Furthermore, unlike conventional systems and methods, the methods and systems described herein may be configured to execute automatically (e.g., without human intervention) and without requiring a user to undertake tasks requiring specialized skills of a data scientist such as, for example, guiding the search process, data set refinement, or specifying metrics for searching for machine learning models to generate and execute.

The system 100 may include a data set preparation engine 115 that provides functionality for analyzing data and cleaning one or more data sets; this functionality may include at least one data preparation tool. The data set preparation engine 115 may access one or more data sets prior to execution of the machine learning engine 103 in order to prepare the one or more data sets for processing by the machine learning engine 103.

The data set preparation engine 115 may include functionality for converting one type of model forecast into a second type of model forecast; for example, the data set preparation engine 115 may convert data represented by a first type of model into a time series model.

The data set preparation engine 115 may perform an initial analysis of one or more data sets and generate a recommendation for one or more additional data sources to access and from which to retrieve data from for processing by the machine learning engine 103. The data set preparation engine 115 may execute a large language model to identify the additional one or more data sources.

The data set preparation engine 115 may auto-generate human language summaries for machine-calculated groupings for analytically relevant data sets.

The system 100 may include functionality for receiving a natural language description of a data manipulation for data generated by the machine learning engine 103 and automatically generate executable code for performing the data manipulation and then execute the automatically generated code.

Figure 5:
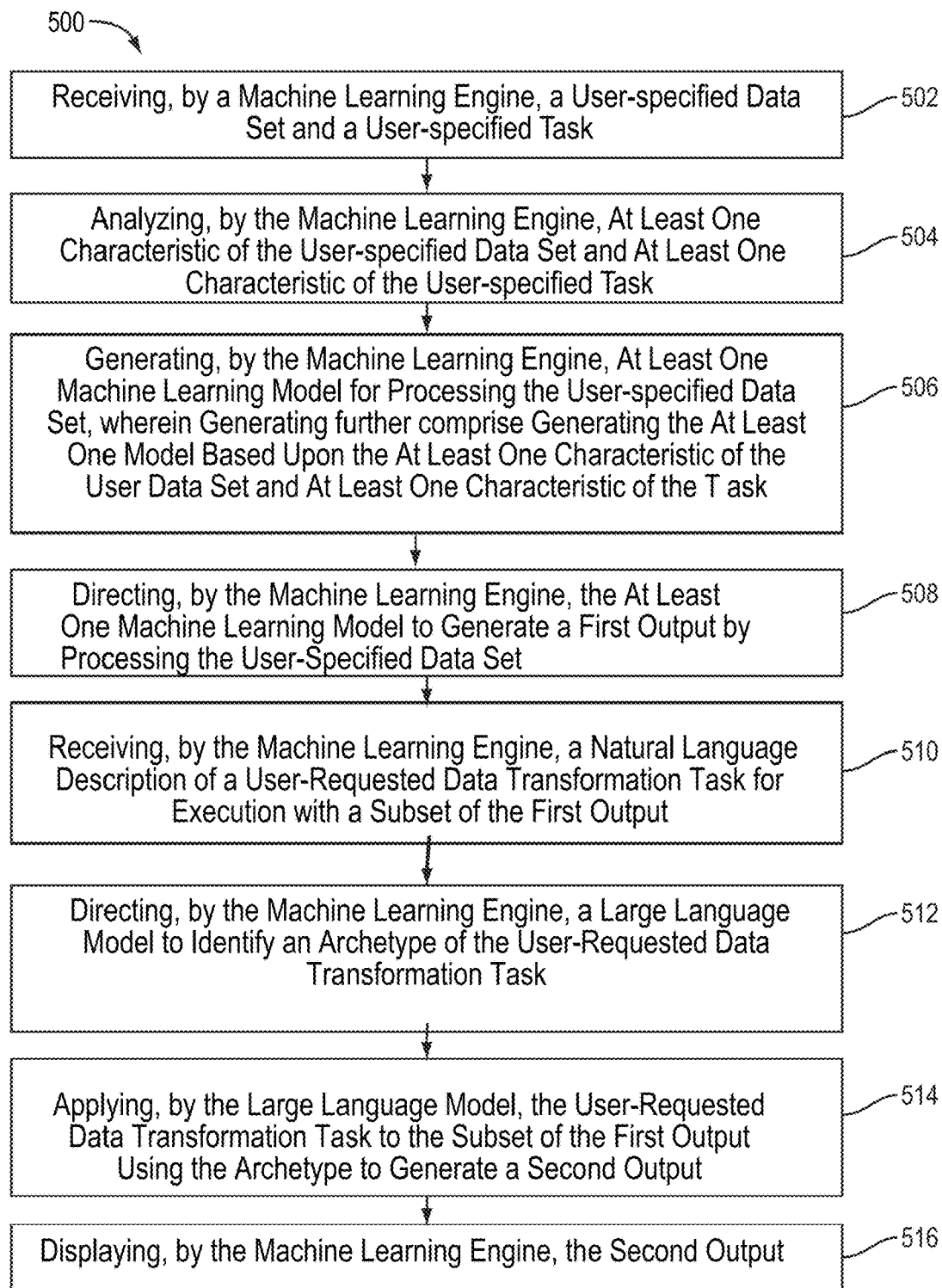
FIG. 5 is a flow diagram depicting an embodiment of a method for automatically generating and executing computer code using a natural language description of a data manipulation to be performed on a data set.

Referring now to FIG. 5, a flow diagram depicts an embodiment of a method for automatically generating and executing computer code using a natural language description of a data manipulation to be performed on a data set. The method 500 includes receiving, by a machine learning engine, a user-specified data set and a user-specified task (502). The method 500 includes analyzing, by the machine learning engine, at least one characteristic of the user-specified data set and at least one characteristic of the user-specified task (504). The method 500 includes generating, by the machine learning engine, at least one machine learning model for processing the user-specified data set, wherein generating further comprises generating the at least one machine learning model based upon the at least one characteristic of the user-specified data set and at least one characteristic of the user-specified task (506). The method 500 includes directing, by the machine learning engine, the at least one machine learning model to generate a first output by processing the user-specified data set (508). The method 500 includes receiving, by the machine learning engine, a natural language description of a user-requested data transformation task for execution with a subset of the first output (510). The method 500 includes directing, by the machine learning engine, a large language model to identify an archetype of the user-requested data transformation task (512). The method 500 includes applying, by the large language model, the user-requested data transformation task to the subset of the first output using the archetype to generate a second output (514). The method 500 includes displaying, by the machine learning engine, the second output (516).

Referring now to FIG. 5 in greater detail and in connection with FIGS. 1-3, the method 500 includes receiving, by a machine learning engine, a user-specified data set and a user-specified task (502). Receiving the user-specified data set and the user-specified task may occur as described above in connection with FIG. 2 at 202.

The method 500 includes analyzing, by the machine learning engine, at least one characteristic of the user-specified data set and at least one characteristic of the user-specified task (504). Analyzing the at least one characteristic of the user-specified data set and the at least one characteristic of the user-specified task may occur as described above in connection with FIG. 2 at 204.

The method 500 includes generating, by the machine learning engine, at least one machine learning model for processing the user-specified data set, wherein generating further comprises generating the at least one machine learning model based upon the at least one characteristic of the user-specified data set and at least one characteristic of the user-specified task (506). The generating of the at least one machine learning model may occur as described above in connection with FIG. 2 at 206-210.

The method 500 includes directing, by the machine learning engine, the at least one machine learning model to generate a first output by processing the user-specified data set (508). The directing may occur as described above in connection with FIG. 2 at 212.

The method 500 includes receiving, by the machine learning engine, a natural language description of a user-requested data transformation task for execution with a subset of the first output (510). Receiving the natural language description may include receiving a prompt to generate executable computer code. The machine learning engine 103 may receive the natural language description from the client computing device 102. The machine learning engine 103 may receive the natural language description from the user interface engine 109. The machine learning engine 103 may execute a machine learning model 107 that performs natural language processing to parse and/or analyze the natural language description.

By way of example, the system 100 may include functionality for receiving a natural language description of a data manipulation for data in a spreadsheet (e.g., a spreadsheet generated by the machine learning engine 103) and automatically (e.g., without human intervention) generate executable code using the natural language description and automatically (e.g., without human intervention) execute the code to complete the described data manipulation. As another example, the system 100 may receive a user-provided natural language description of a task the user wants the system to perform, including references to which subsets of the data the user would like the task performed on (identifying columns or rows in a spreadsheet or identifying sections of a document).

The method 500 includes directing, by the machine learning engine, a large language model to identify an archetype of the user-requested data transformation task (512). The natural language description the system 100 receives may specify one or more possible archetypes of task (for instance, row-wise or column-wise operations or aggregations). A data set preparation engine may use a Large Language Model (LLM) to determine the appropriate archetype, based on the received natural language description. As will be understood by those of ordinary skill in the art, large-language models include very large deep neural networks trained to continue an input sequence of text. For instance, an LLM may be provided with an input sequence such as "I went to the store to" and generate the output sequence "buy some milk". The task is induced by the prompt and the language model is trained on large data sets, including significant amounts of data irrelevant to the particular task.

The method 500 includes applying, by the large language model, the user-requested data transformation task to the subset of the first output using the archetype to generate a second output (514). Depending on the archetype, the LLM may perform the user-requested transformation by applying the transformation directly using the LLM. The LLM may perform the user-requested transformation by determining that access to external data is needed to apply the transformation (for instance, adding a column with the price of a certain stock at a given datetime) and fetching the relevant information from, for example and without limitation, a user provided second database, a database provided with the system 100, one or more external data sources (e.g., via one or more application programming interfaces), one or more external data sources such as information publicly available on the web, and/or executable code generated by the data set preparation engine 115 (e.g., SQL or Python) which is then executed to perform the transformation.

The method may include generating, by the large language model, executable computer code in a computer programming language specified in the natural language description of the user-requested data transformation task. The method may therefore also include executing the generated executable computer code.

The method 500 includes displaying, by the machine learning engine, the second output (516). The machine learning engine 103 may display the second output directly to a user via a display device of the computing device 106a. The machine learning engine 103 may display the second output to a web server available to a user. Alternatively, the machine learning engine 103 may direct the user interface engine 109 to display the second output to the client computing device 102.

Therefore, unlike conventional systems, the methods and systems described herein may combine the functionality of a machine learning engine that can encode and generate machine learning models with characteristics selected based on characteristics of a user-specified task and/or user-specified data with the functionality of a large learning model trained to generate executable code for use in performing additional tasks on the output of the generated machine learning models and with the functionality of the machine learning engine to evaluate and validate the generated code and then execute the generated code. A machine learning engine with functionality for interacting with a large language model to generate and execute validated computer code to perform user-specified task described in a natural language (in contrast to, for example, a computer language) provides a technical improvement over conventional systems.

Figure 6:
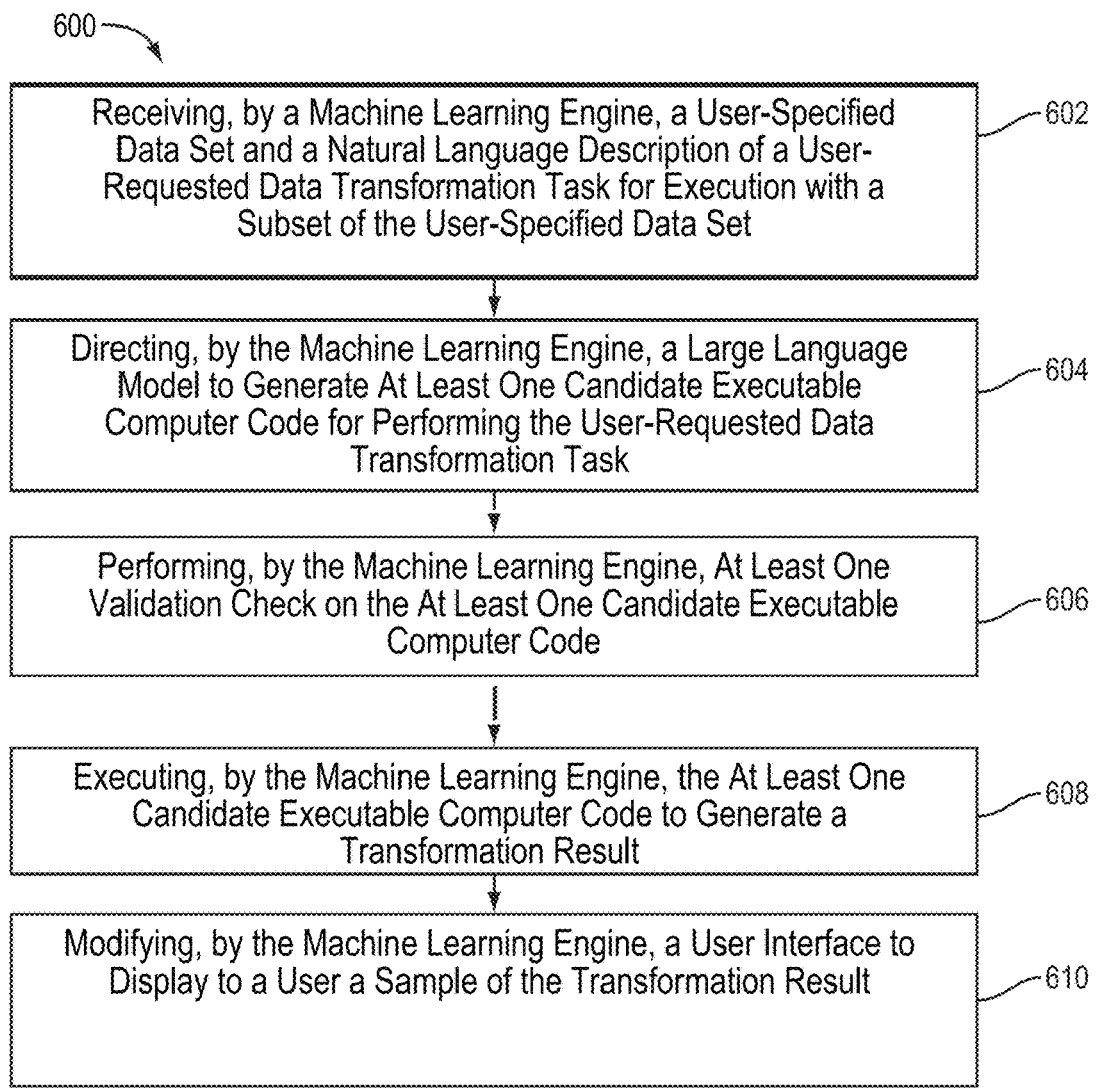
FIG. 6 is a flow diagram depicting an embodiment of a method for automatically generating and executing computer code using a natural language description of a data manipulation to be performed on a data set.

Referring now to FIG. 6, a flow diagram depicts an embodiment of a method 600 for automatically generating and executing computer code using a natural language description of a data manipulation to be performed on a data set. In brief overview, the method 600 includes receiving, by a machine learning engine, a user-specified data set and a natural language description of a user-requested data transformation task for execution with a subset of the user-specified data set (602). The method 600 includes directing, by the machine learning engine, a large language model to generate at least one candidate executable computer code for performing the user-requested data transformation task (604). The method 600 includes performing, by the machine learning engine, at least one validation check on the at least one candidate executable computer code (606). The method 600 includes executing, by the machine learning engine, the at least one candidate executable computer code to generate a transformation result (608). The method 600 includes modifying, by the machine learning engine, a user interface to display to a user a sample of the transformation result (610).

Referring now to FIG. 6 in greater detail and in connection with FIGS. 1-3 and 5, the method 600 includes receiving, by a machine learning engine, a user-specified data set and a natural language description of a user-requested data transformation task for execution with a subset of the user-specified data set (602).

The method 600 includes directing, by the machine learning engine, a large language model to generate at least one candidate executable computer code for performing the user-requested data transformation task (604). The system 100 may execute prompt-engineering functionality to induce the large language model to write code by completing a sequence, for instance by creating an initial sequence such as "The following is code in the following language X using the following libraries Y to perform the task Z:". The system 100 may execute one LLM to generate code in one of a plurality of programming languages. The system 100 may finetune a single LLM for generating code in a specific programming language. The system 10 may execute a plurality of LLMs for generating code. The system 100 may execute functionality in the machine learning engine 103 to select an LLM to execute based upon a characteristic of the natural language description.

The method 600 includes performing, by the machine learning engine, at least one validation check on the at least one candidate executable computer code (606). The machine learning engine 103 may include functionality executed to validate the code generated to ensure that the code generated by the LLM conforms to the specific interface needed for the generated code to interface with non-generated code. The system may therefore execute functionality that uses prompt engineering to induce a specific function definition, for instance ending the prompt with "#a function with X signature that performs Y task def dataset_transform(df, other_args . . . ):"; generates one or more hypothesis programs which will then be evaluated and validated (the validation step is important because not all generated programs will be correct or viable; many will not run); performing security and validation checks such as: evaluating the code using static analysis, evaluating the code using a LLM to perform security analysis for dangerousness or prompt injection attacks, and evaluating the code inside an isolated environment.

The method 600 includes executing, by the machine learning engine, the at least one candidate executable computer code to generate a transformation result (608). Once the at least one candidate code is validated, it may be applied to user data by the machine learning engine 103.

The method 600 includes modifying, by the machine learning engine, a user interface to display to a user a sample of the transformation result (610). The data set preparation engine 115 may modify a user interface to display to a user a preview sample of the transformation results which the user may either confirm or edit the original natural language description to modify their transformation. Upon receiving user input (e.g., confirmation that the preview displays the requested transformation), the data set preparation engine 115 may provide the user with access to a newly transformed dataset, which then may have additional transformations applied to it.

In some embodiments, the methods and systems described herein execute functionality to generate descriptors for statistical output, which may include human readable explanations for the statistical output (e.g., on a per-prediction basis); the system 100 may include a predicting model that is executed by the computing device 106a and which generates such descriptors. A statistical output may suggest a level of importance of one or more characteristics of an input data set that resulted in an output data set; using statistical information about the execution of the predicting model and the outputs on a per-prediction basis, the system 100 may execute functionality to generate a natural language explanation for a particular prediction. The system 100 may execute a large language model to synthesize the statistical information and generate the explanation.

In some embodiments, the methods and systems described herein execute functionality to identify top factors in an outcome. Identifying top factors may include identifying text within a field or other user interface element that impacts an outcome. Using the most important fields (calculated using one or more methods to determine the sensitivity of a model to changes in its input fields), the system may iterate through subsets of each important field. These subsets may be defined on a per-field basis, guided by the data type of that field. For example, for float/integer fields, the system may divide the rows into quantiles; for category fields, the system may analyze one or more categories; for data fields, the system may analyze one or more dates and/or key features of the date (day of week, holidays, etc.); for text fields; the system may generate a dictionary of common tokens present in a particular field and divide rows by the presence or absence of those tokens. The system may then calculate how the target value in those subsets compares to the target value present throughout the dataset.

In some embodiments, the methods and systems described herein execute functionality to generate and execute a request for an analysis based on input received in natural language (e.g., without limitation, a free-form, unstructured text or voice input received from a user). For a given a dataset, the system 100 may receive from a user a description of an analysis to be executed and displayed to the user. The system may receive a specification of one of a plurality of archetypes of task (for instance row-wise or column-wise operations or aggregations). Alternatively, the system may execute an LLM to identify one of a plurality of task archetypes to execute to generate the requested analysis. Depending on the archetype, the LLM may performs the user-requested analysis by generating executable code (for example SQL or Python) which is then executed to perform the transformation (as described above). The system may provide the output to the user in the form of datapoints plotted in a display of a user interface to the user. The system may provide the output to the user in the form of one or more downloadable images.

In some embodiments, the methods and systems described herein execute functionality to automatically find information (including, for example, public information) that is salient to a user dataset and/or modeling problem. The system 100 may execute a method to analyze a data set and make a recommendation for additional information to retrieve to increase a level of utility of the data set for modeling a particular (e.g., user specified) problem. The system 100 may execute an LLM to generate the recommendation. The system 100 may add a column of external public information available via one or more accessible API/database, which is a function of information that is currently in the table. Example use cases include adding a column for the CPI at the given date in the date column or adding a column for the temperature at the hour provided in the time column corresponding to the location in the location column. The system 100 may automatically suggest what public information would be valuable for the given problem, given just the column names (this could be done utilizing a public-source knowledge graph which includes relations such as "depends upon" or "is related to", in conjunction with the previous feature). As an example, the system 100 may execute a data preparation feature that generates a user interface displaying text such as, without limitation, "We noticed two columns in your dataset are labeled CITY_NAME and YEAR. Would you like us to import a column CITY_POPULATION which has the population of that city in a given year?" The system 100 may automatically suggest what public information would be valuable for the given problem, given just the column names, and also smartly recommending which column name to do based on a simple correlation test to see if new proposed column values correlate with the target column. As an example, the system 100 may execute a data preparation feature that generates a user interface displaying text such as, without limitation, "We noticed two columns in your dataset are labeled CITY_NAME and MONTH. Would you like us to import two columns CITY_POPULATION and AVERAGE_TEMP from a public database?Our statistical analyses show that these two columns are highly correlated with your target variable, ICE_CREAM_SALES, so we think they might help your predictive accuracy."

In some embodiments, the methods and systems described herein execute functionality to provide a user interface with which to receive input including a natural language question relating to a specified dataset and generating and displaying output including a natural language response to the input. The system 100 may retrieve via an API to the dataset aggregate data set information including column names, and a response framework for a Large Language Model (LLM); this response framework may call for the ability to fetch additional statistics via one or more other APIs to the same or additional database. The LLM may generate and apply a query to the specified dataset via an API in order to retrieve information needed to respond to the question. After receiving a response to the query, the LLM may generate a plaintext response (e.g., natural language response) to the received question, In some embodiments, the system 100 includes non-transitory, computer-readable medium comprising computer program instructions tangibly stored on the non-transitory computer-readable medium, wherein the instructions are executable by at least one processor to perform each of the steps described above in connection with FIG. 2.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment. However, the scope of protection is defined by the appended claims; the embodiments mentioned herein provide examples.

The terms "A or B", "at least one of A or/and B", "at least one of A and B", "at least one of A or B", or "one or more of A or/and B" used in the various embodiments of the present disclosure include any and all combinations of words enumerated with it. For example, "A or B", "at least one of A and B" or "at least one of A or B" may mean (1) including at least one A, (2) including at least one B, (3) including either A or B, or (4) including both at least one A and at least one B.

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 4A:
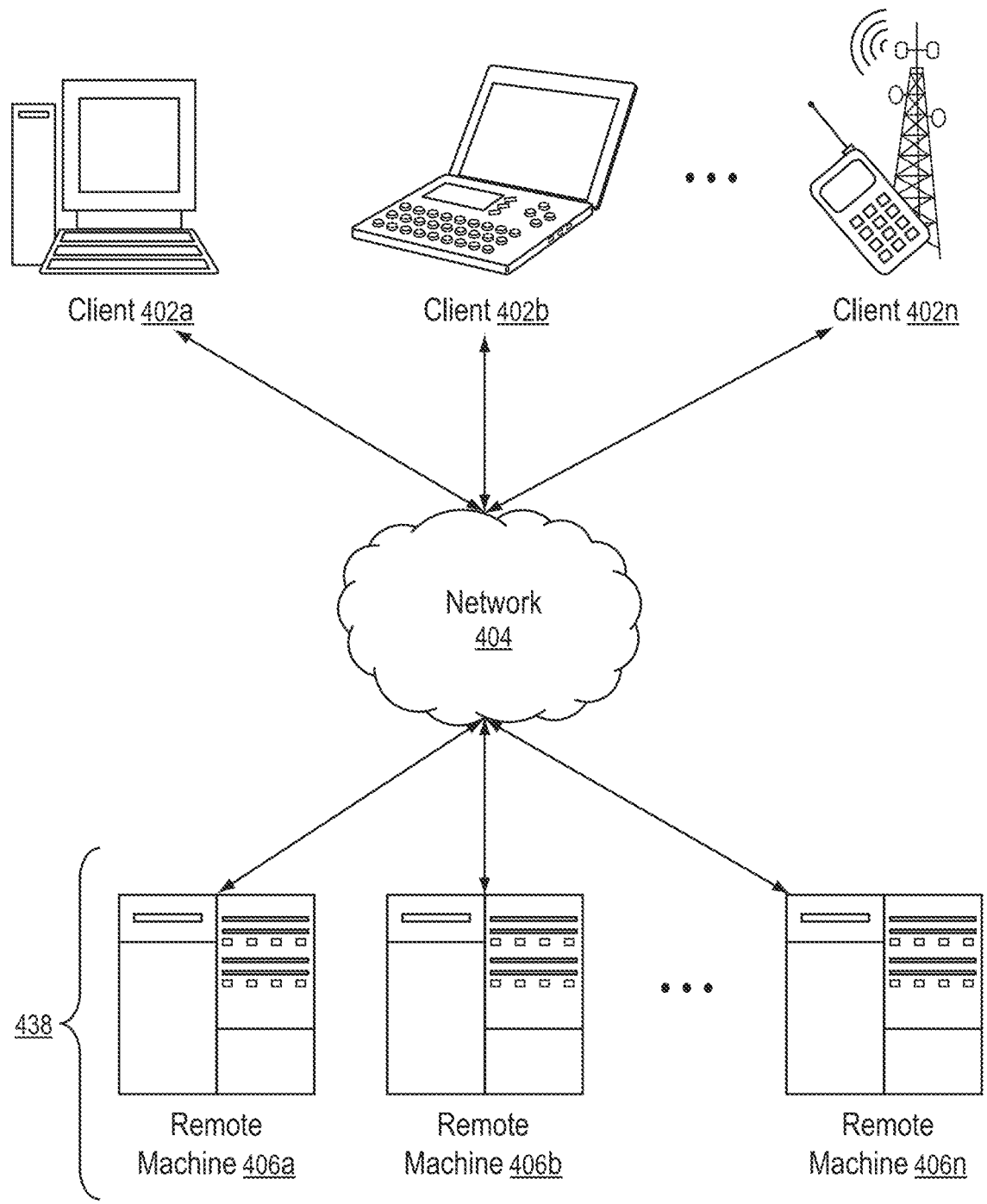
FIGS. 4A-4C are block diagrams depicting embodiments of computers useful in connection with the methods and systems described herein.
Figure 4B:
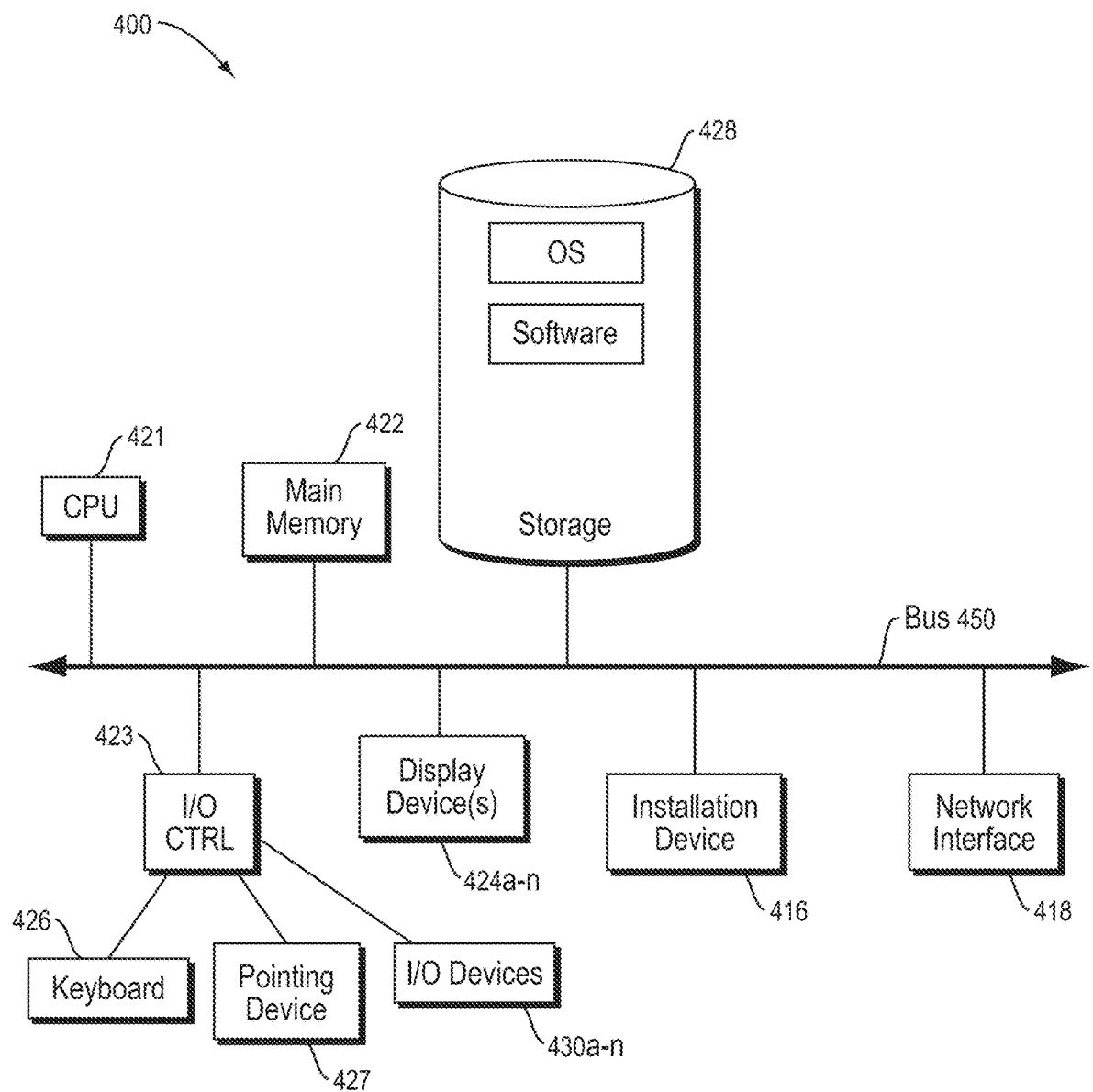
Figure 4C:
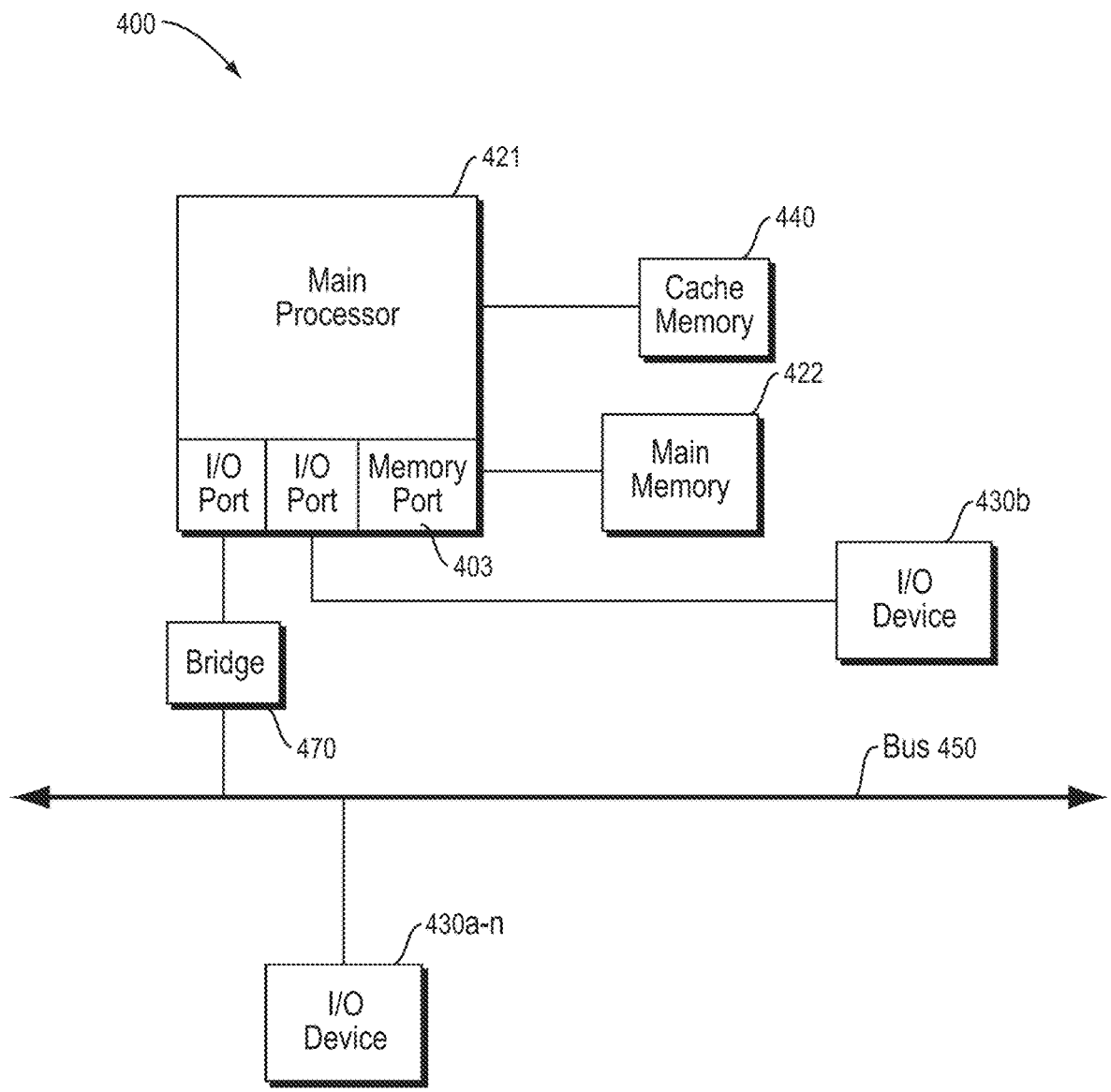

Referring now to FIGS. 4A, 4B, and 4C, block diagrams depict additional detail regarding computing devices that may be modified to execute novel, non-obvious functionality for implementing the methods and systems described above.

Referring now to FIG. 4A, an embodiment of a network environment is depicted. In brief overview, the network environment comprises one or more clients 402a-402n (also generally referred to as local machine(s) 402, client(s) 402, client node(s) 402, client machine(s) 402, client computer(s) 402, client device(s) 402, computing device(s) 402, endpoint(s) 402, or endpoint node(s) 402) in communication with one or more remote machines 406a-406n (also generally referred to as server(s) 406 or computing device(s) 406) via one or more networks 404.

Although FIG. 4A shows a network 404 between the clients 402 and the remote machines 406, the clients 402 and the remote machines 406 may be on the same network 404. The network 404 can be a local area network (LAN), such as a company Intranet, a metropolitan area network (MAN), or a wide area network (WAN), such as the Internet or the World Wide Web. In some embodiments, there are multiple networks 404 between the clients 402 and the remote machines 406. In one of these embodiments, a network 404' (not shown) may be a private network and a network 404 may be a public network. In another of these embodiments, a network 404 may be a private network and a network 404' a public network. In still another embodiment, networks 404 and 404' may both be private networks. In yet another embodiment, networks 404 and 404' may both be public networks.

The network 404 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 404 may comprise a wireless link, such as an infrared channel or satellite band. The topology of the network 404 may be a bus, star, or ring network topology. The network 404 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 402 and a remote machine 406 (referred to generally as computing devices 400) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 402 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client 402.

In one embodiment, a computing device 406 provides functionality of a web server. The web server may be any type of web server, including web servers that are open-source web servers, web servers that execute proprietary software, and cloud-based web servers where a third party hosts the hardware executing the functionality of the web server. In some embodiments, a web server 406 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, WA, the ORACLE IPLANET web server products provided by Oracle Corporation of Redwood Shores, CA, or the ORACLE WEBLOGIC products provided by Oracle Corporation of Redwood Shores, CA.

In some embodiments, the system may include multiple, logically-grouped remote machines 406. In one of these embodiments, the logical group of remote machines may be referred to as a server farm 438. In another of these embodiments, the server farm 438 may be administered as a single entity.

FIGS. 4B and 4C depict block diagrams of a computing device 400 useful for practicing an embodiment of the client 402 or a remote machine 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424a-n, a keyboard 426, a pointing device 427, such as a mouse, and one or more other I/O devices 430a-n. The storage device 428 may include, without limitation, an operating system and software. As shown in FIG. 4C, each computing device 400 may also include additional optional elements, such as a memory port 403, a bridge 470, one or more input/output devices 430a-n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, CA; those manufactured by Motorola Corporation of Schaumburg, IL; those manufactured by Transmeta Corporation of Santa Clara, CA; those manufactured by International Business Machines of White Plains, NY; or those manufactured by Advanced Micro Devices of Sunnyvale, CA. Other examples include SPARC processors, ARM processors, processors used to build UNIX/LINUX "white" boxes, and processors for mobile devices. The computing device 100 may be based on any of these processors, or any other processor capable of operating as described herein.

Main memory unit 422 may be one or more memory chips capable of storing data and allowing any storage location to be directly accessed by the microprocessor 421. The main memory 422 may be based on any available memory chips capable of operating as described herein. In the embodiment shown in FIG. 4B, the processor 421 communicates with main memory 422 via a system bus 450. FIG. 4C depicts an embodiment of a computing device 400 in which the processor communicates directly with main memory 422 via a memory port 403. FIG. 4C also depicts an embodiment in which the main processor 421 communicates directly with cache memory 440 via a secondary bus, sometimes referred to as a backside bus. In other embodiments, the main processor 421 communicates with cache memory 440 using the system bus 450.

In the embodiment shown in FIG. 4B, the processor 421 communicates with various I/O devices 430 via a local system bus 450. Various buses may be used to connect the central processing unit 421 to any of the I/O devices 430, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 also communicates directly with an I/O device 430b via, for example, HYPERTRANSPORT, RAPIDIO, or INFINIBAND communications technology.

One or more of a wide variety of I/O devices 430a-n may be present in or connected to the computing device 400, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 423 as shown in FIG. 4B. Furthermore, an I/O device may also provide storage and/or an installation medium 416 for the computing device 400. In some embodiments, the computing device 400 may provide USB connections (not shown) to receive handheld USB storage devices such as the USB Flash Drive line of devices manufactured by Twintech Industry, Inc. of Los Alamitos, CA.

Referring still to FIG. 4B, the computing device 400 may support any suitable installation device 416, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 400 may provide functionality for installing software over a network 404. The computing device 400 may further comprise a storage device, such as one or more hard disk drives or redundant arrays of independent disks, for storing an operating system and other software. Alternatively, the computing device 400 may rely on memory chips for storage instead of hard disks.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may comprise a built-in network adapter, network interface card, PCMCIA network card, card bus network adapter, wireless network adapter, USB network adapter, modem, or any other device suitable for interfacing the computing device 400 to any type of network capable of communication and performing the operations described herein.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 400 of the sort depicted in FIGS. 4B and 4C typically operates under the control of operating systems, which control scheduling of tasks and access to system resources. The computing device 400 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, WINDOWS 8, WINDOWS VISTA, and WINDOWS 10 all of which are manufactured by Microsoft Corporation of Redmond, WA; MAC OS manufactured by Apple Inc. of Cupertino, CA; OS/2 manufactured by International Business Machines of Armonk, NY; Red Hat Enterprise Linux, a Linux-variant operating system distributed by Red Hat, Inc., of Raleigh, NC; Ubuntu, a freely-available operating system distributed by Canonical Ltd. of London, England; or any type and/or form of a Unix operating system, among others.

Having described certain embodiments of methods and systems for automatically generating and executing computer code using a natural language description of a data manipulation to be performed on a data set, it will be apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for automatically generating, and executing in real time, computer code using a natural language description of a data manipulation to be performed on a data set, the method comprising:
    receiving, by a machine learning engine executing on a computing device, a user-specified data set and a user-specified task;
    analyzing, by the machine learning engine, at least one characteristic of the user-specified data set and at least one characteristic of the user-specified task;
    generating, by the machine learning engine, at least one machine learning model for processing the user-specified data set, wherein generating further comprises generating the at least one machine learning model based upon the at least one characteristic of the user-specified data set and at least one characteristic of the user-specified task and wherein generating further comprises executing a neural architecture search to progressively build an ensemble of a plurality of machine learning models;
    directing, by the machine learning engine, the at least one machine learning model to generate a first output by processing the user-specified data set;
    receiving, by the machine learning engine, a natural language description of a second user-requested data transformation task for execution with a subset of the first output;
    directing, by the machine learning engine, a large language model to identify an archetype of the user-requested data transformation task;
    applying, by the large language model, the user-requested data transformation task to the subset of the first output using the archetype to generate a second output, wherein applying further comprises generating, by a data set preparation engine, executable code for performing the user-requested data transformation task;
    executing, by the computing device, the generated executable code with the subset of the first output; and
    displaying, by a user interface engine in communication with the machine learning engine, to a user, a user interface including a display of the second output.

2. The method of claim 1, wherein receiving the natural language description of the user-requested data transformation task further comprises receiving a prompt to generate executable computer code.

3. The method of claim 1 further comprising generating, by the large language model, executable computer code in a computer programming language specified in the natural language description of the user-requested data transformation task.

4. The method of claim 3 wherein applying further comprises executing the generated executable computer code.

5. A method for automatically generating, and executing in real time, computer code using a natural language description of a data manipulation to be performed on a data set, the method comprising:
    receiving, by a machine learning engine executing on a computing device, a user-specified data set and a natural language description of a user-requested data transformation task for execution with a subset of the user-specified data set;
    directing, by the machine learning engine, a large language model to generate at least one candidate executable computer code for performing the user-requested data transformation task;

generating, by the large language model in communication with a data set preparation engine, the at least one candidate executable computer code;

performing, by the machine learning engine, at least one validation check on the at least one candidate executable computer code;

executing, by the machine learning engine, the at least one candidate executable computer code to generate a transformation result; and modifying, by a user interface engine in communication with the machine learning engine, a user interface to display to a user a sample of the transformation result.

* * * * *